(12) United States Patent
Greenbaum

(10) Patent No.: US 9,011,651 B2
(45) Date of Patent: Apr. 21, 2015

(54) APPARATUS AND METHOD FOR THE ELECTROLYSIS OF WATER

(75) Inventor: Elias Greenbaum, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1168 days.

(21) Appl. No.: 12/963,857

(22) Filed: Dec. 9, 2010

(65) Prior Publication Data

US 2012/0149789 A1 Jun. 14, 2012

(51) Int. Cl.

| | | |
|---|---|---|
| *C25B 11/00* | (2006.01) | |
| *C25B 1/02* | (2006.01) | |
| *C25B 1/04* | (2006.01) | |
| *C01B 13/02* | (2006.01) | |
| *C25B 1/34* | (2006.01) | |
| *C25B 9/06* | (2006.01) | |
| *C25B 9/08* | (2006.01) | |
| *C25B 11/02* | (2006.01) | |
| *C10G 45/02* | (2006.01) | |
| *C10G 49/00* | (2006.01) | |
| *C10G 2/00* | (2006.01) | |

(52) U.S. Cl.
CPC ............... *C25B 1/04* (2013.01); *C01B 13/0207* (2013.01); *C25B 1/34* (2013.01); *C25B 9/06* (2013.01); *C25B 9/08* (2013.01); *C25B 11/02* (2013.01); *Y02E 60/366* (2013.01); *C10G 45/02* (2013.01); *C10G 49/00* (2013.01); *C10G 2/32* (2013.01)

(58) Field of Classification Search
CPC ......... C25B 11/0442–11/0494; C25B 11/0421
USPC ........................................ 205/628–639, 340
See application file for complete search history.

(56) References Cited

U.S. PATENT DOCUMENTS

| | | | |
|---|---|---|---|
| 4,302,322 A | * | 11/1981 | Oda et al. ....................... 204/293 |
| 4,737,249 A | | 4/1988 | Shepard, Jr. et al. |
| 5,037,518 A | | 8/1991 | Young et al. |
| 5,089,107 A | | 2/1992 | Pacheco |

(Continued)

FOREIGN PATENT DOCUMENTS

| | | |
|---|---|---|
| CN | 201345163 Y | 11/2009 |
| JP | 56-93883 | 7/1981 |
| WO | WO 2004/082054 A1 | 9/2004 |

OTHER PUBLICATIONS

International Search Report and Written Opinion dated Jul. 31, 2012 received from the Korean Intellectual Property Office from related International Application No. PCT/US2011/062291.

(Continued)

*Primary Examiner* — Bryan D. Ripa
*Assistant Examiner* — Brian W Cohen
(74) *Attorney, Agent, or Firm* — Scully, Scott, Murphy & Presser, P.C.

(57) ABSTRACT

An apparatus for the electrolytic splitting of water into hydrogen and/or oxygen, the apparatus comprising: (i) at least one lithographically-patternable substrate having a surface; (ii) a plurality of microscaled catalytic electrodes embedded in said surface; (iii) at least one counter electrode in proximity to but not on said surface; (iv) means for collecting evolved hydrogen and/or oxygen gas; (v) electrical powering means for applying a voltage across said plurality of microscaled catalytic electrodes and said at least one counter electrode; and (vi) a container for holding an aqueous electrolyte and housing said plurality of microscaled catalytic electrodes and said at least one counter electrode. Electrolytic processes using the above electrolytic apparatus or functional mimics thereof are also described.

45 Claims, 19 Drawing Sheets

(56) References Cited

U.S. PATENT DOCUMENTS

| | | | |
|---|---|---|---|
| 5,268,081 | A | 12/1993 | Dousek |
| 5,534,120 | A | 7/1996 | Ando et al. |
| 5,665,211 | A | 9/1997 | Leppänen et al. |
| 5,667,647 | A | 9/1997 | Suga et al. |
| 5,968,325 | A | 10/1999 | Oloman et al. |
| 6,613,215 | B2 | 9/2003 | Molter et al. |
| 6,855,450 | B2 | 2/2005 | Molter et al. |
| 7,241,950 | B2 | 7/2007 | Fan et al. |
| 7,270,908 | B2 | 9/2007 | Dristy |
| 7,452,449 | B2 | 11/2008 | Weinberg et al. |
| 7,459,065 | B2 | 12/2008 | Kelly et al. |
| 7,510,633 | B2 | 3/2009 | Shimko et al. |
| 7,550,068 | B2 | 6/2009 | You et al. |
| 7,601,308 | B2 | 10/2009 | Austin |
| 7,633,165 | B2 | 12/2009 | Hsu et al. |
| 7,635,530 | B2 | 12/2009 | Kenis et al. |
| 7,683,459 | B2 | 3/2010 | Ma et al. |
| 2004/0118348 | A1 | 6/2004 | Mills |
| 2007/0059584 | A1 | 3/2007 | Nakano et al. |
| 2008/0128275 | A1 | 6/2008 | Soloveichik |
| 2008/0177098 | A1 | 7/2008 | Bahnmuller et al. |
| 2008/0264780 | A1 | 10/2008 | Kato et al. |
| 2009/0061213 | A1 | 3/2009 | Bahnmuller et al. |
| 2009/0294300 | A1 | 12/2009 | Kanzius |
| 2009/0308729 | A1 | 12/2009 | Gallimore et al. |
| 2009/0325014 | A1 | 12/2009 | Newkirk |
| 2010/0101941 | A1 | 4/2010 | Surikov et al. |
| 2010/0133110 | A1 | 6/2010 | Nocera et al. |
| 2010/0206722 | A1 | 8/2010 | Haryu et al. |

OTHER PUBLICATIONS

Greenbaum E., "Metabolic Prosthesis for Oxygenation of Ischemic Tissue", *IEEE Transactions on Biomedical Engineering* 56(2):528-531 (2009).

Kanan M.W. et al., "In Situ Formation of an Oxygen-Evolving Catalyst in Neutral Water Containing Phosphate and $CO^{2+}$", *Science* 321:1072-1075 (2008).

Yameen B. et al., "Facile Large-Scale Fabrication of Proton Conducting Channels", *J. Am. Chem. Soc.* 130(39):13140-13144 (2008).

Pichonat T. et al., "Mesoporous Silicon-Based Miniature Fuel Cells for Nomadic and Chip-Scale Systems", *Microsyst Technol* 12:330-334 (2006).

Ivy J., "Summary of Electrolytic Hydrogen Production: Milestone Completion Report", National Renewable Energy Laboratory, NREL/MP-560-36734 (2004).

Mitrovski S.M. et al., "Microfluidic Devices for Energy Conversion: Planar Integration and Performance of a Passive, Fully Immersed $H_2$-$O_2$ Fuel Cell", *Langmuir* 20(17):6974-6976 (2004).

Glowacki B. et al., "A Smart Look at Grain Boundaries", *Materials World* 6(11):683-686 (1998).

Davis R.E. et al., "The Solubility and Diffusion Coefficient of Oxygen in Potassium Hydroxide Solutions", *Electrochhnica Acta* 12:287-297 (1967).

\* cited by examiner

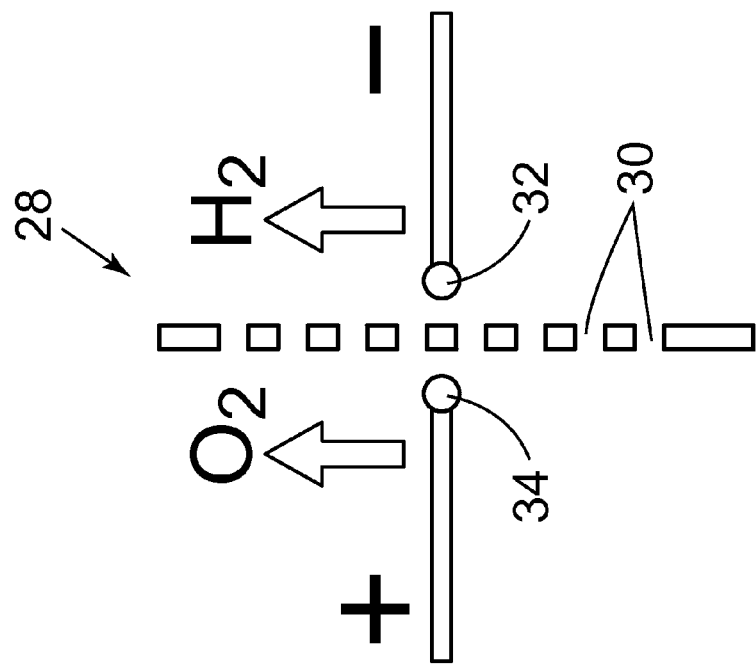
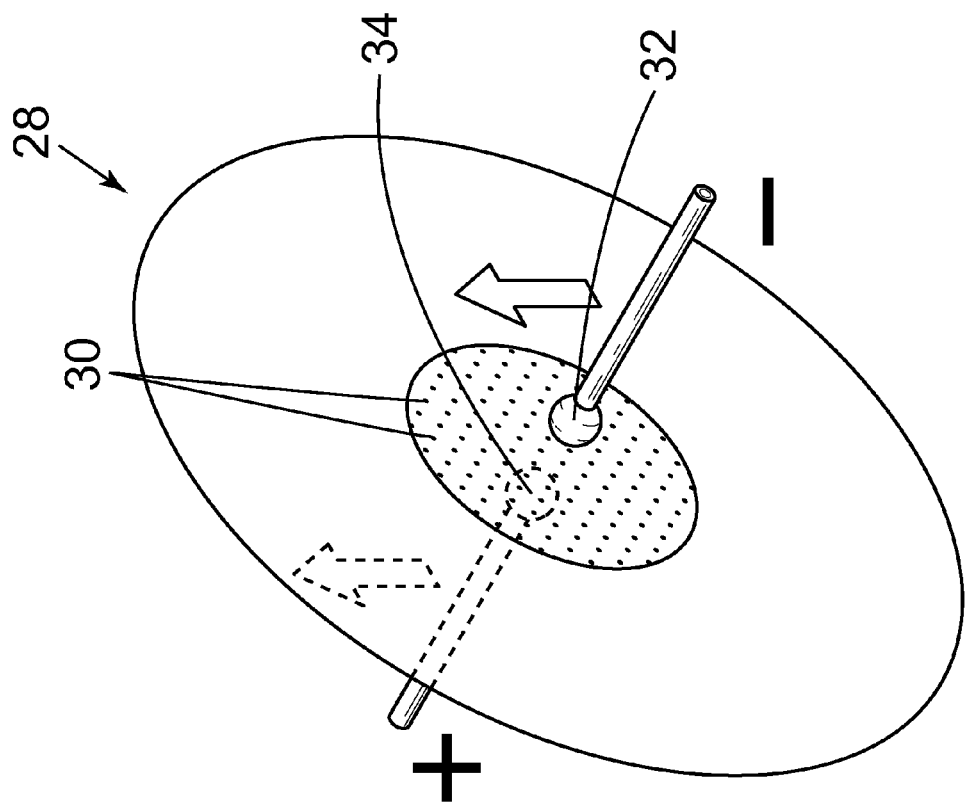

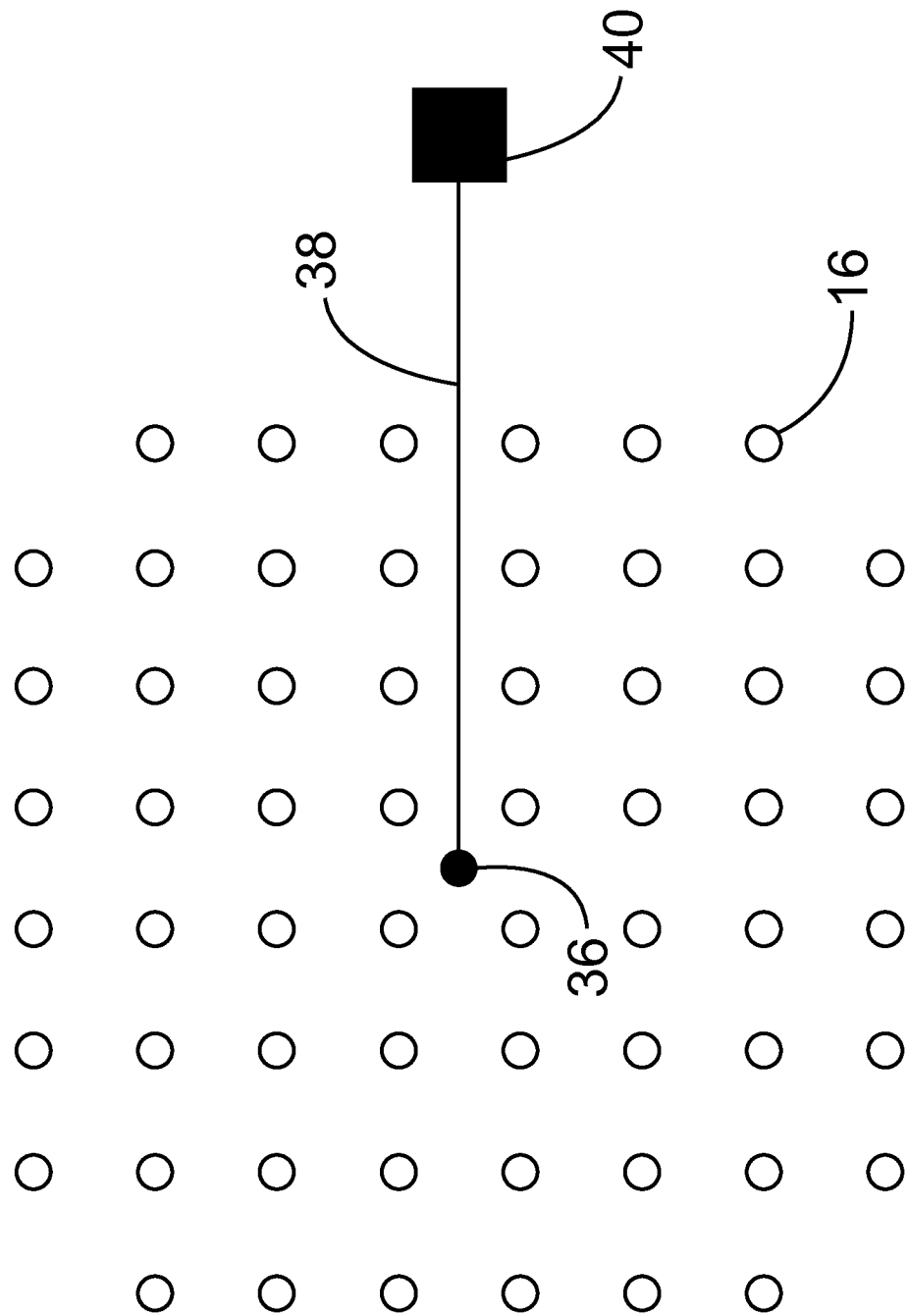

APPARATUS AND METHOD FOR THE ELECTROLYSIS OF WATER

This invention was made with government support under Contract Number DE-AC05-00OR22725 between the United States Department of Energy and UT-Battelle, LLC. The U.S. government has certain rights in this invention.

FIELD OF THE INVENTION

The present invention relates, generally, to the field of hydrogen and oxygen gas production, and particularly, to water electrolysis devices and methods of use.

BACKGROUND OF THE INVENTION

Hydrogen gas, in particular, is used in vast quantities for numerous industrial applications. The demand for hydrogen is increasing, particularly as hydrogen is increasingly being pursued as an ideal fuel source.

By far, the most common processes for producing hydrogen gas involve the reaction and breakdown of fossil fuels. Some examples of these types of processes include steam reforming of natural gas and coal gasification. However, these processes have the significant disadvantages of relying on a non-renewable and polluting resource. In particular, large quantities of carbon monoxide and carbon dioxide are generally produced in fossil fuel-based methods for hydrogen production. Accordingly, there is considerable interest in finding cleaner methods for the large-scale production of hydrogen.

One possible alternative method is the electrolysis of water. The electrolysis of water produces hydrogen and oxygen gas without the production of toxic and environmentally unfriendly byproducts. Moreover, since the electrolytic method uses electricity as the power source, another advantage of the electrolytic process over hydrocarbon processes is its amenability in receiving electrical power from a renewable source, such as solar, wind, or hydroelectric power. Some patent references directed to electrolysis technology include, for example, U.S. Pat. Nos. 7,601,308, 7,550,068, 7,510,633, 7,459,065, 7,452,449, 7,270,908, 7,241,950, 6,855,450, 6,613,215, 5,968,325, 5,667,647, 5,665,211, 5,534,120, 5,268,081, 5,089,107, 5,037,518, and 4,737,249, and U.S. Application Publication Nos. 2010/0206722, 2010/0101941, 2009/0325014, and 2008/0264780.

The electrolysis of water involves the decomposition (i.e., "splitting") of water into oxygen and hydrogen gas by the action of an electric voltage (i.e., current) being applied to the water across electrodes of opposite polarity. Hydrogen is produced at the negative electrode (cathode) and oxygen is produced at the positive electrode (anode), as shown by the following well-known chemical equations:

Cathode (reduction): $2H^+(aq) + 2e^- \rightarrow H_2(g)$

Anode (oxidation): $2H_2O(l) \rightarrow O_2(g) + 4H^+(aq) + 4e^-$

Although the electrolytic process has the advantage of more cleanly producing hydrogen and is amenable to being powered by renewable sources, the electrolytic process remains non-competitive with conventional hydrocarbon processes because of the labor-intensive and materials cost of conventional electrolyzers as well as the prohibitive cost of current precious metal electrodes (e.g., complex platinum plates or honeycombs) used in electrolyzers of the art. Therefore, since hydrogen can be produced more affordably from fossil fuels, electrolytic processes for producing hydrogen have generally been limited to small-scale operations.

Yet, it has been estimated that in a future hydrogen economy, electrolyzers 10 to 100 times the size of today's largest units would be needed (Ivy, J., "Summary of Electrolytic Hydrogen Production", National Renewable Energy Laboratory, NREL/MP-560-36734). Moreover, such large-scale electrolyzers would be greatly beneficial at the present time to take the place of existing hydrogen production technologies. Clearly, state-of-the-art electrolysis technology is significantly deficient in producing such large-scale amounts of hydrogen and oxygen in a clean and cost-effective manner.

SUMMARY OF THE INVENTION

In a first aspect, the invention is directed to an apparatus for the electrolytic splitting of water into hydrogen and/or oxygen gas. In some embodiments, the electrolytic apparatus described herein makes use of a plurality of microscaled catalytic electrodes (i.e., microelectrodes) on a surface. In other embodiments, functional mimics of microelectrodes (e.g., a distribution of catalytic hot spots) are used on a bulk electrode to achieve the same or similar benefits provided by an array of microelectrodes. The microscaled catalytic electrodes or functional mimics thereof can function as cathodes (i.e., where hydrogen is produced), or anodes (i.e., where oxygen is produced). In particular embodiments, each of the microscaled electrodes is independently addressable, i.e., independently powered, adjusted, and/or monitored.

In a first particular embodiment, the electrolytic apparatus includes: (i) at least one lithographically-patternable substrate having a surface; (ii) a plurality of microscaled catalytic electrodes embedded in the surface, wherein the microscaled catalytic electrodes are either catalytic anode electrodes or catalytic cathode electrodes; (iii) at least one counter electrode in proximity to but not on the surface, wherein the counter electrode includes at least one catalytic cathode electrode if the microscaled catalytic electrodes are catalytic anode electrodes, or the counter electrode includes at least one catalytic anode electrode if the microscaled catalytic electrodes are catalytic cathode electrodes; (iv) means for collecting evolved hydrogen and/or oxygen gas; (v) electrical powering means for applying a voltage across the plurality of microscaled catalytic electrodes and the at least one counter electrode; and (vi) a container for holding an aqueous electrolyte and housing the plurality of microscaled catalytic electrodes and the at least one counter electrode.

In a second particular embodiment, the electrolytic apparatus includes: (i) a first lithographically-patternable substrate having a first surface, and a plurality of microscaled catalytic anode electrodes on the first surface; (ii) a second lithographically-patternable substrate having a second surface, and a plurality of microscaled catalytic cathode electrodes on the second surface; (iii) means for collecting evolved hydrogen and/or oxygen gas; (iv) electrical powering means for applying a voltage across the plurality of microscaled catalytic anode and cathode electrodes; and (v) a container for holding an aqueous electrolyte and housing the plurality of microscaled catalytic anode and cathode electrodes. In further embodiments, the microscaled catalytic anode and cathode electrodes are not separated by an ion-permeable barrier. In other embodiments, the microscaled catalytic anode and cathode electrodes are separated by an ion-permeable barrier.

In a third particular embodiment, the electrolytic apparatus includes: (i) at least one rigid planar substrate made of a semiconducting composition, the at least one rigid planar substrate having a first surface, and a second surface opposite the first surface; (ii) a plurality of microscaled catalytic anode electrodes disposed on the first surface; (iii) a plurality of microscaled catalytic cathode electrodes disposed on the second surface; (iv) at least one pore connecting the first and second surfaces; (v) electrical powering means for applying a voltage across the plurality of microscaled catalytic anode and cathode electrodes; (vi) a first compartment that surrounds the microscaled catalytic anode electrodes while excluding the microscaled catalytic cathode electrodes; (vii) a second compartment that surrounds the microscaled catalytic cathode electrodes while excluding the microscaled catalytic anode electrodes, and (viii) means for collecting evolved hydrogen and oxygen gases. In the foregoing embodiment, the rigid planar substrate functions as a common wall adjoining (i.e., separating) the first and second compartments.

In a fourth particular embodiment, the electrolytic apparatus includes: (i) at least one first rigid planar substrate made of a semiconducting composition, the at least one first rigid planar substrate having a first planar surface on which a plurality of microscaled catalyst anode electrodes are disposed, and a second planar surface opposite to the first planar surface; (ii) at least one second rigid planar substrate made of a semiconducting composition, the at least one second rigid planar substrate having a first planar surface on which a plurality of microscaled catalytic cathode electrodes are disposed, and a second planar surface opposite to the first planar surface; (iii) a proton exchange (or polyelectrolyte) membrane (PEM) having first and second planar surfaces and sandwiched between the first and second rigid planar substrates, wherein the first planar surface of the membrane is in physical contact with the second planar surface of the first rigid planar substrate, and the second planar surface of the membrane is in physical contact with the second planar surface of the second rigid planar substrate; (iv) at least one pore having a first section and a second section, wherein the first and second pore sections are colinear, and the first pore section extends from the membrane to the first planar surface of the first rigid planar substrate, and the second pore section extends from the membrane to the first planar surface of the second rigid planar substrate; (v) electrical powering means for applying a voltage across the plurality of microscaled catalytic anode and cathode electrodes; (vi) a first compartment that surrounds the microscaled catalytic anode electrodes while excluding the microscaled catalytic cathode electrodes; (vii) a second compartment that surrounds the microscaled catalytic cathode electrodes while excluding the microscaled catalytic anode electrodes, and (viii) means for collecting evolved hydrogen and oxygen gases. The foregoing fourth embodiment is generally depicted in FIGS. 7A and 7B. FIGS. 7A and 7B are meant to be exemplary, and hence, non-limiting to the fourth embodiment. Numerous modifications and adjustments can be made to the embodiments shown in FIGS. 7A and 7B. In the foregoing embodiment, the planar substrate/PEM membrane combination functions as a common wall adjoining (i.e., separating) the first and second compartments. One method of implementing the electrical powering means in (v) utilizes the 3D microchip stacking technique "through via technology" described in U.S. Pat. Nos. 7,683,459 and 7,633,165.

A first particular advantage provided by the instant electrolytic system is the significantly reduced amount of electrocatalytic precious metal needed, as compared to bulk precious metal electrodes, for producing an equivalent amount of hydrogen or oxygen. A second particular advantage provided by the instant electrolytic system is, in particular embodiments, the ability to dispense with a proton-conducting membrane (i.e., proton-exchange or polymer-electrolyte membrane) or any barrier that functions to separate the anode and cathode or place the anode and cathode in separate compartments. A third particular advantage provided by the instant electrolytic system is the ability of the system to maintain efficient production of hydrogen and oxygen gas even if one or a certain number of microscaled electrodes fails. A fourth particular advantage provided by the instant electrolytic system is the ability of the system to be significantly scaled up by increasing the number of microscaled electrodes, and this, in a cost-effective and efficient manner by the use of photolithographic methods for patterning large numbers of the microscaled electrodes on a suitable substrate.

In a fifth particular embodiment, the electrolytic apparatus includes: (i) a bulk catalytic electrode containing thereon a plurality of microscopic catalytic hot spots on a surface of the bulk catalytic electrode, wherein the bulk catalytic electrode is either a catalytic anode or catalytic cathode; (ii) a counter electrode; (iii) means for collecting evolved hydrogen and/or oxygen gas; (iv) electrical powering means for applying a voltage across the bulk catalytic electrode and counter electrode; and (v) a container for holding an aqueous electrolyte and housing the bulk catalytic electrode and counter electrode.

In a sixth particular embodiment, the electrolytic apparatus includes: (i) a bulk catalytic electrode having on its surface an insulating layer containing a plurality of microscopic holes therein, wherein the bulk catalytic electrode is either a catalytic anode or catalytic cathode, and the holes permit the bulk catalytic electrode to be exposed to electrolyte only at the holes; (ii) a counter electrode; (iii) means for collecting evolved hydrogen and/or oxygen gas; (iv) electrical powering means for applying a voltage across the bulk catalytic electrode and counter electrode; and (vi) a container for holding an aqueous electrolyte and housing the bulk catalytic electrode and counter electrode.

In another aspect, the invention is directed to an efficient method for producing hydrogen and/or oxygen gas by processing an aqueous electrolyte with any of the electrolytic systems described above. In particular embodiments, the electrolytic system is electrically powered by a renewable energy source or a source of electricity that is generated by nuclear power. In the case of nuclear electricity, the excess or byproduct heat, such as provided in the operation of a nuclear power plant can be used in conjunction with the electrolytically-produced hydrogen and oxygen for certain fuel-producing manufacturing operations. For example, the method described above for producing hydrogen and/or oxygen gas is coupled to a process that utilizes hydrogen or oxygen gas (e.g., a Fischer-Tropsch, Haber process, or petroleum refining process).

In yet another aspect, the invention is directed to a method for producing chlorine and/or a metal hydroxide by a chloralkali process. The chloralkali process involves processing an aqueous metal-chloride salt electrolyte with any of the electrolytic systems described above such that chlorine gas is produced at the anode side of the electrolyzer and hydrogen gas and a metal hydroxide are produced at the cathode side of the electrolyzer. In particular embodiments, the chloralkali process described above is electrically powered by a renewable or nuclear energy source. In other particular embodiments, the chloralkali process described above is coupled to a process that utilizes chlorine gas and/or a metal hydroxide.

In particular embodiments, some of the objects of the present invention include: a method and apparatus for the electrolysis of water in which hydrogen and oxygen are produced on opposite sides of an electroactive barrier (or membrane), wherein the sides are patterned with one or more electrolytic electrodes; a means for maintaining electroneutrality via a proton or ion channel; a means for sending power to the electroactive barrier via wireless telemetry, for example, for actuating the electrolytic electrodes; a means for bidirectional information transfer via wireless telemetry, for example, that sends command information to the individual electrodes of the electroactive membrane and receives status and operational information from the electrodes. Further and other objects of the present invention will become apparent from the description contained herein.

BRIEF DESCRIPTION OF THE DRAWINGS

FIG. 1a is an overall conceptual view. FIG. 1b is a more detailed view of a specially fabricated silicon wafer electrode assembly embedded in a common wall (FIG. 1a) between hydrogen and oxygen compartments.

FIGS. 4a, 4b. Illustrations depicting an exemplary apparatus using wire electrodes for testing the utility of the invention (low cross migration of $H_2$ and $O_2$. See FIG. 1 for additional perspective.

FIG. 5. Illustration depicting an exemplary arrangement of microelectrodes, traces, bond pads and pores on a substrate (only one electrode, trace and bond pad are shown for the sake of clarity).

FIG. 7a, exploded view, depicts an embodiment in which a wafer-electrode assembly includes a PEM membrane sandwiched between two silicon wafers. In one embodiment, the electrical powering means for performing electrolysis utilizes through-silicon via technology. FIG. 7b is an assembled view of the wafer electrode assembly sandwich-like structure.

DETAILED DESCRIPTION OF THE INVENTION

Figure 1A:
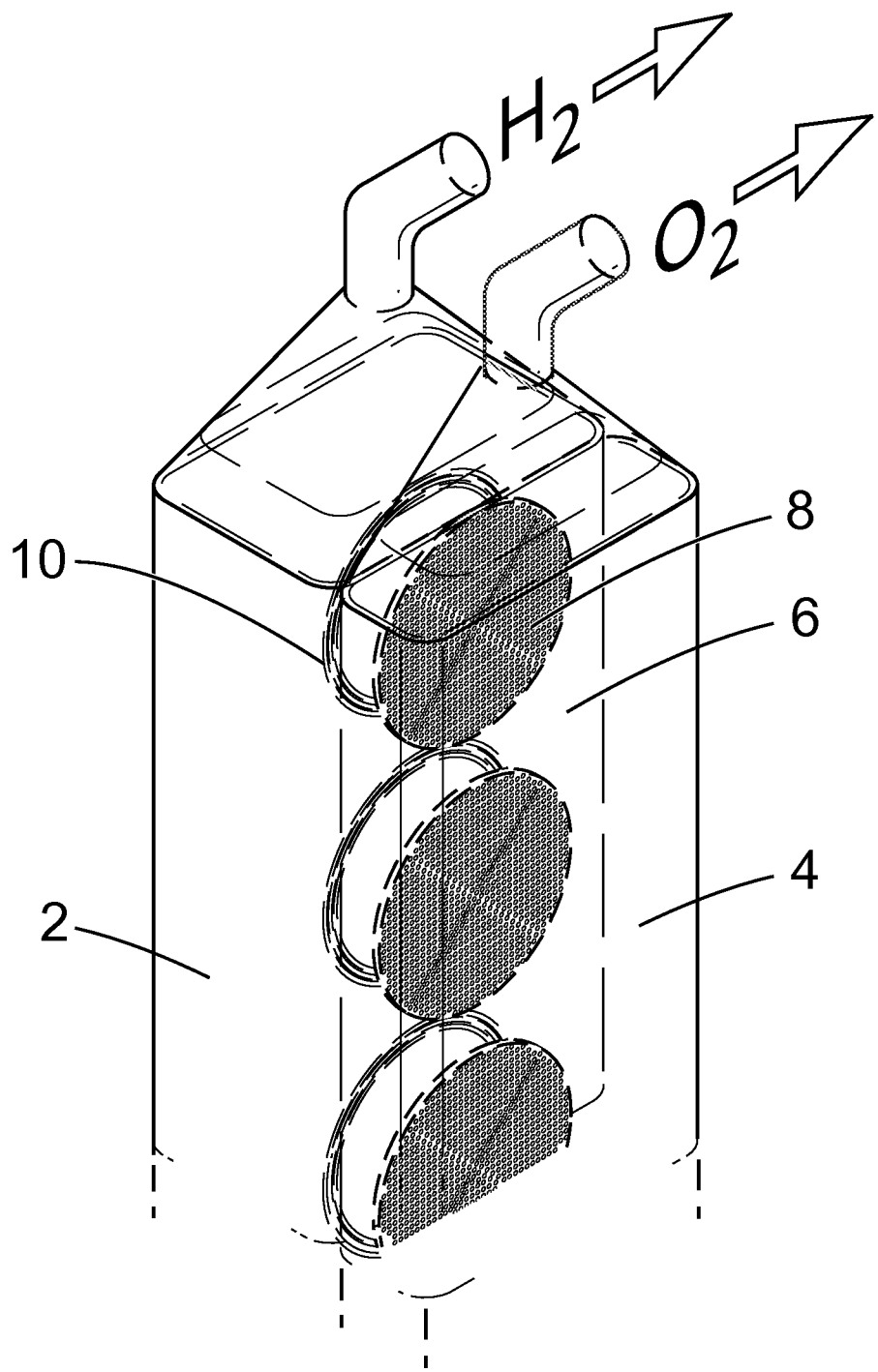
FIGS. 1a, 1b. Drawings depicting an exemplary water electrolysis device.

In one aspect, the invention is directed to an apparatus (i.e., electrolyzer) for the electrolytic splitting of water into hydrogen and/or oxygen. In most embodiments, the electrolyzer produces both hydrogen (at the cathode) and oxygen (at the anode) in stoichiometric or near-stoichiometric amounts. However, under particular conditions known in the art, the electrolyzer may produce another gas or chemical in place of, or in addition to, either hydrogen or oxygen (e.g., the chloralkali process in which chlorine gas is predominantly produced at the anode).

In particular embodiments, the electrolyzer includes at least one lithographically-patternable substrate (i.e., substrate) having a surface upon which a plurality of microscaled catalytic electrodes (i.e., microelectrodes or electrodes) are embedded. By being "embedded" into the surface is meant that the electrodes are attached or within the substrate surface provided that the electrocatalytic portion of the electrode is exposed so that it can make contact with the aqueous electrolyte during operation.

In other particular embodiments, the microelectrodes are embedded into the surface by lithographic patterning of the microelectrodes onto the substrate. Lithographic patterning includes any process by which a pattern is constructed on a surface, e.g., physical lithography (e.g., stamping), photolithography, and other forms of lithography. Photolithographic processes, in particular, are particularly advantageous in that they have the ability to deposit large numbers of electrodes onto a substrate in a short period of time and in a cost-effective manner. Any of the lithographic (particularly photolithographic) patterning processes of the art used for semiconductor device fabrication and fabrication of integrated circuits can be used for imprinting the microelectrodes onto the substrate. In particular embodiments, the microelectrodes are imprinted by physical or chemical vapor deposition (i.e., PVD or CVD), electroplating, electroless plating, or sputtering deposition of the electroactive metal followed by a lift off, etching, or standard lithography/etch process known in the art. The etching process can be, for example, a surface micromachining or high aspect ratio micromachining (i.e., deep reactive-ion etch) process. In some embodiments, the lithographic method employs a photomask or reticle to lay down the pattern, while in other embodiments (e.g., in electron beam lithography) a mask may not be used. See, for example, W. M. Moreau, *Semiconductor Lithography: Principles, Practices, and Materials (Microdevices)*, Springer, 1st Ed., 1987, and C. A. Mack, *Fundamental Principles of Optical Lithography: the Science of Microfabrication*, Wiley, 2008, both of which comprehensively describe a range of lithographic techniques that can be used herein for patterning of microelectrodes and associated wiring and electronics on a substrate. The contents of W. M. Moreau and C. A. Mack are herein incorporated by reference in their entirety.

In particular embodiments, the microelectrodes are deposited by any of the modified semiconductor device fabrication technologies employed in manufacturing microelectromechanical systems (MEMS) devices, now well-established in the art. The microelectrodes of the instant invention can include a variety of specialized electronic components other than bonding pads and wiring. Some examples of specialized electronic components include microsensors, data processing units, and microprocessors. Other specialized components include an electric feedthrough means (e.g. "through vias"), perpendicular to the plane of the wafer, which facilitates the application of a voltage to a cathode and anode pair located on opposite sides of the wafer. MEMS manufacturing processes can include any of a variety of techniques, such as, for example, molding, plating, wet etching, dry etching (e.g., RIE and DRIE), and electrical discharge machining (EDM), all of which are useful for imprinting a range of miniaturized electronic components.

In other particular embodiments, the microelectrodes are deposited by a conductive ink printing process. In the ink printing process, a depression (e.g., channel, groove, or complex features) is made in the substrate surface. The features of the depression can be made by, for example, a stamping die or roller. The depression is then filled in with a conductive ink, such as a conductive polymer or metal-containing ink. The metal-containing ink can include the metal or conductive carbon in any suitable form, such as metal particles or precursor compound. Generally, after deposition of the metal-containing ink, the ink-coated substrate is post-treated under conditions (e.g., a heating or irradiation step) that removal solvent and cause the metal particles or metal precursor to fuse and form conducting features. The features, once produced, may be amplified or appropriately modified by deposition of additional metal by other means, such as electrolytic or electroless plating. The details of a typical ink printing process is found, for example, in U.S. Application Pub. No. 2009/0061213, the contents of which are incorporated herein by reference in their entirety.

The substrate can be any of the lithographically-patternable substrates known in the art. In many embodiments, the substrate has a semiconducting composition (e.g., as used in the manufacture of integrated circuits, microchips, and MEMS devices). Commonly, the semiconducting substrate is rigid, such as a silicon-containing substrate (e.g., silicon or silicon carbide), germanium, gallium arsenide, gallium nitride, indium arsenide, indium phosphide, boron nitride, or a combination thereof, and crystalline, polycrystalline, amorphous, and p- and n-doped versions thereof. Although the examples given above are all inorganic in composition, the semiconducting substrate can be or include an organic semiconducting composition. Some examples of organic semiconducting materials include polyphenylenevinylene, polyacetylene, polypyrrole, and polyaniline. In other embodiments, particularly in the case of an organic semiconducting substrate, the substrate can be non-rigid (i.e., flexible). In some embodiments, one or more of the above classes or specific types of substrates are excluded as a substrate material.

In particular embodiments, the substrate is silicon. The silicon can be in any suitable form, such as crystalline, polycrystalline, or amorphous. The silicon can also be p-doped (e.g., with boron) or n-doped type (e.g., with phosphorus) or a combination thereof. Multilayered forms of silicon are also contemplated, as are multilayer substrates containing one or more layers of silicon and one or more layers of a semiconducting or non-conducting composition, including 3D sandwich-like structures in which a PEM membrane is bonded between two silicon wafers using through-silicon via technology.

In yet other embodiments, the substrate is, or includes, an insulating (i.e., low-conducting or non-conducting) composition amenable to the deposition or embedding of microelectrodes therein, preferably by a lithographic process. The insulating composition, can be, for example, a rigid or flexible polymer, a ceramic, or a hybrid organic-inorganic material. For the purposes of the instant invention, the substrate material is preferably insoluble in, and non-reactive with, water and aqueous electrolytes, particularly their alkalinized forms. Some examples of insulating polymers include, for example, polyethylene, polypropylene, polymethyl methacrylate (PMMA), polycarbonate, polyvinylchloride (PVC), silicones, polyimides, and the fluoropolymers, such as polytetrafluoroethylene (PTFE), fluorosilicones, and fluoroelastomers. Some examples of ceramic materials include the metal oxides (e.g., titanium oxide, silicon oxide, and indium tin oxide), silicates, aluminates (e.g., alumina), and aluminosilicates. Some examples of hybrid organic-inorganic materials include hybrid sol-gel (e.g., ormosil) and metal oxide framework (MOF) materials. In some embodiments, one or more of the above classes or specific types of substrates are excluded as a substrate material.

The substrate can have any suitable shape, such as a filled (i.e., non-hollow) cuboidal, bulbous, or spherical type of shape. However, more commonly, the substrate considered herein has a flat (i.e., planar) shape. The planar substrate can have angled or curved edges. Moreover, the planar substrate can be in the form of a flat (i.e., straight) sheet or in the form of a rolled, cylindrical, or helical sheet. The planar substrate may also be formed into a polyhedral shape, such as a hollow box or multisided column. Regardless, the planar substrate possesses at least two surfaces, i.e., a first and a second planar surface. Unless otherwise indicated, the planar surfaces considered herein are those having the larger surface areas as compared to edge surfaces of the planar substrate. Generally, the microelectrodes are embedded into either or both of the planar surfaces of a planar substrate.

The planar substrate can have any suitable thickness, including any of the thicknesses available in silicon wafers commonly used in semiconductor device fabrication. In particular embodiments, the planar substrate has a thickness of precisely, about, less than, up to, or greater than, for example, 1, 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, or 1000 microns (µm), or a thickness within a range bounded by any two of the foregoing exemplary values. The diameter of the planar substrate (i.e., longest distance across a planar surface) can be of any size that can properly fit into the container of the electrolyzer while not becoming a significant impediment to the electrolysis process. Generally, particularly in the case of silicon wafers, the diameter varies from one or two inches (i.e., 25 or 50 mm) up to 18 inches (i.e., ~450 mm). Particularly in the case of silicon wafers, the thickness of the silicon wafer generally increases with increasing diameter.

In some embodiments, a first planar surface of a planar substrate contains anode or cathode microelectrodes embedded therein while the second planar surface of the planar substrate (opposite to the first planar surface) does not contain anode or cathode microelectrodes embedded therein or disposed thereon in any manner. In other embodiments, a first and second planar surface of a planar substrate each contains microelectrodes embedded therein or disposed thereon. The microelectrodes on the first planar surface may have the same construction as microelectrodes on the second planar surface, particularly when the microelectrodes on both surfaces are expected to perform the same function (i.e., as anodes or as cathodes). However, in instances where microelectrodes on each planar surface of a planar substrate are desired to perform different functions (e.g., cathode microelectrodes on one side and anode microelectrodes on the opposite side), they may all be of the same construction but operated differently so that they perform different functions. In particular embodiments, the microelectrodes embedded in the second planar surface are counter electrodes to the microelectrodes on the first planar surface, and the microelectrodes on the first planar surface have a different or same construction (e.g., different or same electrocatalytic material) than the counter electrodes.

The microelectrodes of the instant invention have at least one microscale dimension. For example, one, two, or all of the dimensions of the microelectrodes can be microscale. In different embodiments, the at least one microscale dimension is precisely, about, less than, or up to, for example, 1, 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, 1000, 1100, 1200, 1300, 1400, 1500, 2000, 2500, 3000, 3500, 4000, 4500, or 5000 microns ($\mu$m), or a size within a range bounded by any two of the foregoing exemplary values. In particular embodiments, the microelectrode has at least one microscale dimension of at least 10, 20, 30, 40, 50, 60, 70, 80, 90, or 100 microns and up to 200, 300, 400, 500, 600, 700, 800, 900, 1000, 1500, or 2000 microns.

The microelectrodes contain at least one electrocatalytic metal (i.e., catalytic metal) effective as a cathode or anode material in a water electrolysis system. The catalytic metal can be any of the metals known in the art having this property. Some examples of catalytic electrode metals include platinum, palladium, nickel, gold, tungsten, ruthenium, molybdenum, tantalum, cobalt, iron, and carbon, as well as composites and alloys thereof, such as platinum-coated titanium or platinum-nickel alloy, respectively. In some embodiments, the anode and cathode electrodes have the same electrocatalyst composition, while in other embodiments, the anode and cathode electrodes have different compositions.

The electrocatalyst composition of either the anode, cathode, or both, may be appropriately modified to adjust the reactivity of the electrode, such as by making one or both of the electrodes able to produce a species other than hydrogen or oxygen. For example, if chlorine production is desired by the chloralkali process, anode microelectrodes may be modified to include a more non-reactive electrode material, such as titanium or carbon. Alternatively, when adapting the electrolytic process to a chloralkali process, the anode microelectrodes may be constructed of a non-reactive (i.e., non-catalytic) material useful in producing more chlorine than oxygen, while the cathode microelectrodes contain a catalytic material more suitable for producing hydrogen and metal hydroxide. Other applications, such as reduction of carbon dioxide, can be achieved by including one or more non-reactive metals in the electrocatalytic composition.

The microelectrodes may further include a coating (e.g., $MnO_2$) for increasing the operational stability, Faradaic efficiency, or corrosion resistance of the electrode. The electrocatalytic portion of the microelectrodes may also be formed in situ, such as by the in situ formation of an oxygen-evolving catalyst in water containing phosphate and $Co^{+2}$ ions (Kanan, M. W., and Nocera, D. G. (2008), *Science*, 321, pp. 1072-1075). The microelectrodes may further be hermetically sealed, by methods known in the art, provided that electrocatalytic (i.e., active) surfaces of the microelectrodes are exposed (i.e., accessible to the aqueous electrolyte).

In some embodiments, the electrocatalytic portion of the microelectrode is non-porous (i.e., smooth or continuous). In other embodiments, the electrocatalytic portion of the microelectrode is porous, rough, or corrugated. The porosity can correspond to a pore volume of or at least, for example, 5, 10, 20, 30, 40, 50, 60, 70, or 80 volume percent, or a pore volume within a range between any two of these values.

The term "plurality of microelectrodes", as used herein, indicates, in its most basic sense, at least two microelectrodes. However, as the instant invention is particularly focused on the large scale production of hydrogen and oxygen, a "plurality of microelectrodes" is herein more typically defined as at least 5, 10, 20, 30, 40, 50, 100, 200, 300, 400, 500, 1,000, 2,000, 3,000, 4,000, 5,000, 10,000, 20,000, or 50,000 microelectrodes or cathode/anode pairs per total surface area of a substrate surface, or per a specific area (e.g., per $cm^2$) of the substrate surface.

The plurality of microelectrodes described above are in proximity to at least one counter electrode, provided that the at least one counter electrode is not on the same surface as the plurality of microelectrodes. In particular embodiments, the counter electrode refers to a plurality of counter microelectrodes. By being a counter electrode, the counter electrode is designed to function in a polarity opposite of the microelectrodes. For example, if the microelectrodes are cathodes, the at least one counter electrode functions as an anode, and conversely, if the microelectrodes are anodes, the at least one counter electrode functions as a cathode. In some embodiments, the microelectrodes and counter electrode contain the same electrocatalytic material. By being in "proximity to" is meant that the microelectrodes and at least one counter electrode are close enough to efficiently conduct protons and/or other ionic species between each other (i.e., across an electrolyte). Typically, the microelectrodes and at least one counterelectrode are also in electrical communication. However, the instant invention includes the possibility that the anode and cathode, together in a common electrolyte, are each engaged in separate electrical circuits with other counter electrodes not in the common electrolyte.

In a first set of embodiments, the counter electrode includes one or more bulk electrocatalytic anodes or cathodes of the art. The bulk electrocatalytic anode or cathode of the art can have any of the compositions, as described above, as well as any suitable size, shape, or other physical characteristics.

In a second set of embodiments, the counter electrode is or includes a plurality of microelectrodes, i.e., a second plurality of microelectrodes that are counter electrodes to a first plurality of microelectrodes described above. The plurality of microelectrodes of the counter electrode (i.e., counter microelectrodes) can have any of the compositional and physical characteristics described above for the first plurality of microelectrodes.

Furthermore, the plurality of microelectrodes of the counterelectrode can be embedded in a second surface, which is a surface different from the first surface on which the first plurality of microelectrodes are embedded. In one embodiment, the second surface on which the plurality of counter microelectrodes are embedded is not located on the substrate (i.e., first substrate) on which the first plurality of microelectrodes are embedded, i.e., the plurality of counter microelectrodes are embedded in one or more surfaces of a second substrate, wherein it is understood that the first and second substrates are different (i.e., separate and not attached). In another embodiment, the second surface on which the plurality of counter microelectrodes are embedded is located on a different surface but on the same substrate on which the first plurality of microelectrodes are embedded. For example, in particular embodiments, the substrate is a planar substrate having a first planar surface and a second planar surface (i.e., first and second sides) opposite to each other, wherein the first planar surface contains a plurality of microelectrodes thereon, and the second planar surface contains a plurality of counter electrodes thereon. As used herein, the term "same substrate" can refer to a single continuous (i.e., seamless) substrate, or alternatively, to two or more substrate portions connected or bonded to each other. In some instances, one or more gaps may exist between the substrate portions, and the substrate portions attached by one or more connection or bond points.

As known in the art, in order for a water electrolyzer to function properly, means need to be included to prevent hydrogen and oxygen gases from mixing, while selectively allowing the movement of protons and/or other ionic species from the anode to the cathode. Conventional practice in the art has been to include an ion-conducting material (e.g., a proton exchange membrane) for this purpose. Although an ion-conducting material can also be used in the instant invention, the electrolytic apparatus described herein can advantageously dispense with an ion-conducting or ion-permeable material altogether. Thus, in particular embodiments of the instant invention, a plurality of microelectrodes and a counter electrode (which can be a plurality of counter microelectrodes), both held on separate substrates, are not separated by any means, i.e., an ion-permeable or ion-conducting barrier is not included. Although other non-partitioning features, such as microfluidic channels, may be included in some embodiments to modify or aid the flow between anode and cathode compartments, the foregoing barrier-less embodiment generally excludes any such feature or other feature placed between the anode and cathode, other than the electrolyte itself.

Figure 16:
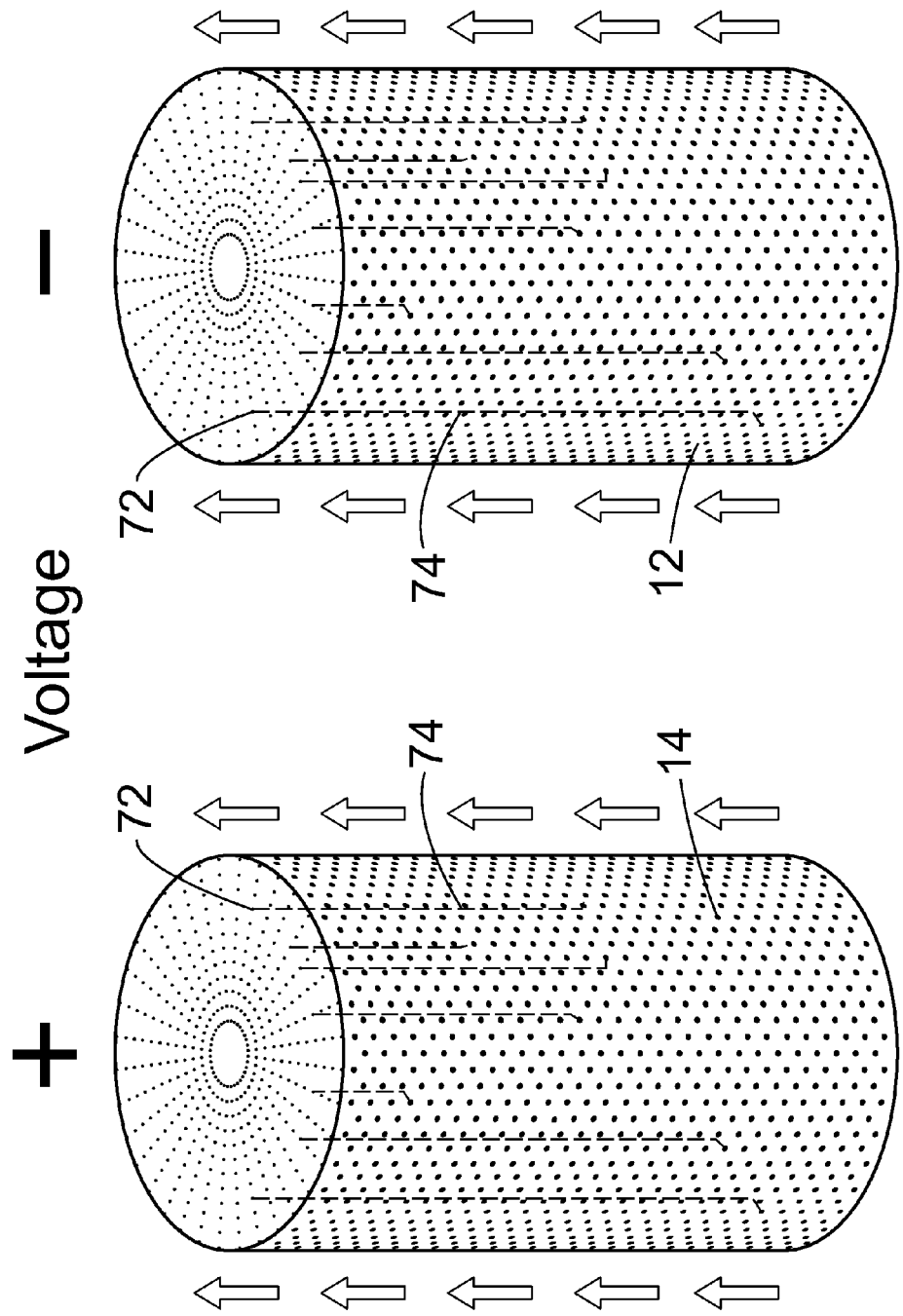
FIG. 16. Illustration depicting an electrolytic system according to an embodiment of the invention corresponding to the data of FIG. 15 with no membrane or barrier between the electrodes, i.e., a membraneless electrolytic system.
Figure 17:
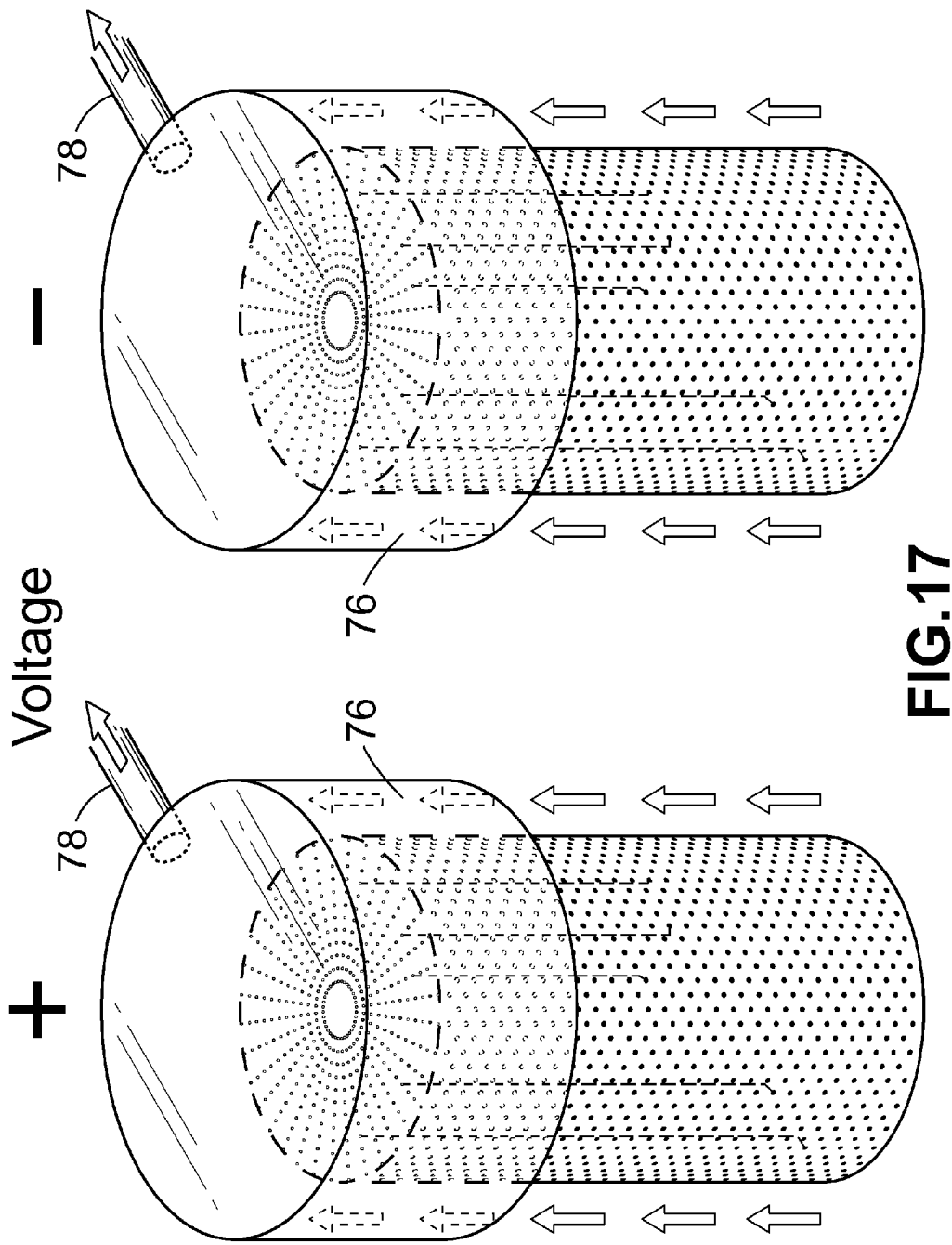
FIG. 17. Illustration of an embodiment of the membraneless electrolytic system corresponding FIG. 16, and further including canopy gas collection devices.

Reference is made to FIGS. 16 and 17 in which a barrier-less embodiment is depicted. As shown in FIGS. 16 and 17, two electrode systems of opposite polarities are in close proximity and in a common electrolyte without an ion-permeable barrier between the electrode systems. Each electrode system is depicted as a cylindrical substrate on which are embedded microelectrodes, as represented by the indicated dots. A means for collecting produced hydrogen and/or oxygen is necessary during the electrolytic process. The means can be any such means, such as a simple partitioning device held above one or both of the electrode systems, such as the canopies depicted in FIG. 17, wherein the partitioning device defines or separates gas collecting compartments.

In FIG. 16, electrical contacts 72 are connected by electrically conducting means 74 to the anodes 14 and cathodes 12. The vertical arrows indicate product gases oxygen and hydrogen rising in laminar flow. Examples of electrically conducting means 74 are conventional wires or superconducting wires. The latter will minimize resistive heating loses in transmitting electrical current to the anodes 14 and cathodes 12.

In FIG. 17, separate canopies 76 are placed over each of the ensembles of cathodes and anodes. Each canopy has an outlet tube 78 for collecting their respective product gases. The bottom edges of the canopies extend below the level of the static electrolyte in the chamber. They define restricted headspaces in the cathode and anode regions of the apparatus. There is no gas-phase diffusion pathway between the hydrogen and oxygen headspaces. The only diffusion pathway for dissolved molecular hydrogen and oxygen is in the static electrolyte. It is known in the art that the characteristic diffusion times for dissolved hydrogen and oxygen molecules in static liquid are much longer that the characteristic escape times for gas bubbles ascending in static liquids under the action of buoyant forces. These principles allow the production of separate streams of hydrogen and oxygen with good purity which are removed from the headspaces via collection tubes 78.

The apparatus described herein is able to operate without an ion-permeable membrane or any type of partition primarily by virtue of the small size of the microelectrodes, along with careful adjustment of electrode currents to be below a threshold current at which hydrogen or oxygen bubbles produced at the electrode surface will burst. By preventing bursting, the onset of turbulence in the bulk electrolyte is avoided. The small size of the instant microelectrodes, along with careful adjustment of electrode currents to be below said threshold current, produces bubbles that grow at the electrode surface, break free, and ascend without bursting by gravitational buoyant force. Preferably, the bubbles rise (i.e., vertically) in a column of static (i.e., non-flowing) liquid. Accordingly, preferably, the aqueous electrolyte considered herein is not subjected to turbulence, as can occur under laminar flow conditions.

By preventing the bursting of bubbles and turbulence, hydrogen is slow to reach the vicinity of the anode, while oxygen is slow to reach the vicinity of the cathode. The rate of diffusion of dissolved hydrogen and oxygen in the static electrolyte is much slower than the rate of bubble rise in the column of electrolyte. This large difference in the respective kinetic rates of gas transport ensures production of gas streams of high purity. Another advantage of the instantly described barrier-less (i.e., membraneless) set up is that the anode and cathode, particularly when both include a plurality of microelectrodes, can be held in close proximity in the absence of any cross-contamination of gases between electrodes, especially in dense, viscous electrolytes with a low solubility of oxygen, such as 12 M KOH. The close proximity of anode and cathode is advantageous for the reason that the closer the proximity between anode and cathode, the lower the resistance, and thus, the more energy-efficient the electrolysis system. Generally, a "close proximity" between anode and cathode indicates a spacing between anode and cathode electrodes of up to or less than 30 cm, 25 cm, 20 cm, 15 cm, 10 cm, 5 cm, 1 cm, or 0.5 cm, or a range of distance between any two of the foregoing exemplary values. Particularly when both the anode and cathode sides are both a plurality of microelectrodes, the foregoing exemplary distances or ranges thereof between anode and cathode electrodes can refer to nearest electrodes, farthest electrodes, an average distance, or range of distances between cathode and anode electrodes. During the course of operation of the electrolysis device, the electrolyte will become saturated with dissolved oxygen and hydrogen. The dissolved oxygen will eventually occupy the same physical space as the rising hydrogen bubbles from the cathode. However, because of the slow process of diffusion of oxygen in a static liquid, the purity of the produced hydrogen gas is generally at least 90% $H_2$ and no more than 10% $O_2$, or better, as indicated by the data presented herein. In some embodiments, the purity of the produced hydrogen gas is at least 95% $H_2$ with no more than 5% $O_2$. In yet other embodiments, the purity of the produced hydrogen gas is at least 98% or 99% $H_2$ with no more than 2% or 1% $O_2$, respectively.

In other embodiments, the anode and cathode electrodes are separated by an ion-permeable (i.e., cation-permeable and/or anion-permeable) barrier. The barrier can be in the form of, for example, a membrane, a rigid wall, or baffle. In some embodiments, the ion-permeable barrier is or includes an ion-conducting material, such as any of the cation or proton exchange materials known in the art. The cation or proton exchange material can be, for example, any of the proton conducting ionomers or resins known in the art. The ionomers or resins are typically solids or gels under the operating conditions of the electrolysis unit. As known in the art, proton-conducting ionomers generally include an alkali or alkaline earth metal salt, or a protonic acid or salt thereof, complexed with one or more polar polymers. The one or more polymers of the proton-conducting ionomer or resin can be, for example, polyimide, polyether, polysiloxane, or polyester, as well as combinations, copolymers, and crosslinked versions thereof. Other resins may be included in the ion conducting barrier, such as phenolic, phenol-formaldehyde, polystyrene, styrene-divinyl benzene, polyvinylchloride, and fluoropolymer resins.

In yet other embodiments, a porous barrier separates the anode and cathode. In some embodiments, the porous barrier is used in the absence of a proton- or ion-conducting material. Instead, ion migration is permitted solely by pores (i.e., channels) present in the barrier. In order to allow migration of ions, the pores connect one surface of the barrier, which faces or contains one of the electrodes, with the opposite surface of the barrier, which faces or contains the counter electrode.

In some embodiments, the porous barrier contains no microelectrodes thereon, i.e., the porous barrier separates an anode from a cathode held in two separate compartments, each being a certain distance from the porous barrier. In the foregoing embodiment, the porous barrier functions as a common wall adjoining the two separate (i.e., anodic and cathodic) compartments. In other embodiments, the porous barrier contains at least one surface, and a plurality of microelectrodes is embedded on at least one surface of the porous barrier. In particular embodiments, the porous barrier is a planar substrate, as described above, containing pores therein, wherein a first planar surface and a second planar surface of the porous barrier each contain microelectrodes embedded thereon, i.e., microelectrodes are embedded on the first planar surface and counter microelectrodes embedded on the second planar surface of the porous barrier.

The pores can have any suitable size (i.e., diameters). In some embodiments, the pores are in the microscale (i.e., micropores). In different embodiments, the micropores have pore diameters of precisely, about, less than, or up to, for example, 1, 2, 3, 4, 5, 6, 7, 8, 9, 10, 15, 20, 25, 30, 35, 40, 45, 50, 55, 60, 65, 70, 75, 80, 85, 90, 95, 100, 125, 150, 175, 200, 250, 300, 350, 400, 450, or 500 microns, or a pore size within a range bounded by any two of the foregoing values. In other embodiments, the pores are in the nanoscale (i.e., nanopores). The nanopores considered herein have pore diameters less than one micron. In different embodiments, the nanopores have pore diameters of precisely, about, less than, or up to, for example, 1, 2, 3, 4, 5, 10, 20, 30, 40, 50, 100, 200, 300, 400, 500, 600, 700, 800, or 900 nm, or a pore size within a range bounded by any two of the foregoing values. In other embodiments, the pores are in the macroscale (i.e., macropores). The macropores considered herein have pore diameters above 500 microns. In different embodiments, the macropores have pore diameters of precisely, about, less than, up to, or above, for example, 600 µm 700 µm, 900 µm, 1 mm, 2 mm, 4 mm, or 5 mm or a pore size within a range bounded by any two of the foregoing values. In other embodiments, the pore size is within a range bounded by any two sizes between micropores, nanopores, and macropores (e.g., 100 nm to 100 µm).

In some embodiments, the pore sizes are moderately or highly uniform by having a moderate or low average deviation, such as ±50%, ±40%, ±30%, ±20%, ±10%, ±5%, ±2%, or ±1%, or less from a particular pore size (e.g., 10 micron pores within a 10% deviation is equivalent to pores having a size ranging from 9 to 11 microns). In other embodiments, the pore sizes are fairly or highly disperse, such as by including a combination of micropores and nanopores, or micropores and macropores, or nanopores and macropores.

In some embodiments, the porous barrier contains as few as one, two, three, four, or five pores. In other embodiments, the porous barrier contains a greater number of pores, such as, at least 10, 20, 30, 40, 50, or 100 pores. In particular embodiments, the porous barrier contains a grid (i.e., pattern) of pores, typically arranged in a fairly or precisely equidistant manner. The pattern of pores can include hundreds or thousands of pores, or alternatively, a number of pores per area of the barrier material (e.g., precisely, at least, or up to 1, 2, 3, 4, 5, 10, 20, 30, 40, 50, 100, 200, 500, 1,000, or 5,000 pores per square centimeter). Although a small number of pores may be incorporated into a substrate by macromachining means (e.g., drilling or stamping), a large number of pores, such as a pattern, can be more efficiently incorporated by a lithographic patterning (e.g., microfabrication) process in which a reactive ion or acid etch process is also used. Alternatively, particularly if nanopores or micropores are desired, these may be incorporated by the process by which the porous substrate is prepared, e.g., by a supramolecular assembly process (e.g., in the production of MOFs) or ceramic firing process.

In several embodiments, the pores are open, i.e., not filled with an ion-conducting material. In other embodiments, the pores, or a portion thereof, are filled with an ion-conducting material.

The electrolysis apparatus described herein also includes a means for collecting evolved hydrogen and/or oxygen gas produced by the electrolytic splitting of water. If a gas other than hydrogen or oxygen is produced (e.g., chlorine), the foregoing means is also capable of collecting any such gas, along with any suitable modifications that may be necessary, such as modification of the walls of the collecting container to be corrosive resistant if a corrosive or reactive gas is produced. In particular embodiments, the means for collecting evolved gases includes a tubular or columnar structure positioned over the anodic or cathodic compartment (and specifically, in a position that will collect bubbles as they break off from the electrode and rise). In the event that both hydrogen and oxygen gas are being separately collected, two different tubular or columnar structures can be separately positioned over each electrode compartment. The foregoing means for collecting gas is based on the feature of the instant invention that bubbles of evolved gas are made to form and break off from the electrode without bursting, after which the bubbles rise through a tube or vertical column to be collected in a holding zone. The holding zone can be, for example, a storage tank or gas-absorbent material, either of which may be pressurized or unpressurized, and either cooled or left at ambient temperature.

In some embodiments, the means for collecting evolved gas is a canopy trapping device positioned over the substrate containing a plurality of microelectrodes. FIG. 17 depicts such canopy trapping devices being used on the electrolytic apparatus depicted in FIG. 16. Referring to FIG. 17, the two electrode systems, each containing a cylindrical substrate having microelectrodes embedded thereon, have been fitted with canopy trapping devices 76. Each canopy trapping device possesses at least the feature that the bottom portion (i.e., portion facing toward the electrode system) is below liquid level and open to allow gas entry, while the top portion (i.e., portion over all of the microelectrodes) is closed to permit gas trapping. By necessity, the top portion of the canopy trapping device needs to be above the electrode system in order to collect all of the evolved gas. In some embodiments, the canopy trapping device is positioned such that the bottom open portion of the trapping device lies over the entire electrode system and does not cover any of the microelectrodes, while in other embodiments, the canopy trapping device is positioned such that the bottom open portion lies at or below a portion or all of the electrode system, thereby covering a portion or all of the microelectrodes. Other features may be incorporated into or used in combination with the canopy trapping devices, such as tubes or outlets for transferring the trapped gas. Pressure gauges may also be included for monitoring the levels of gas being produced. Furthermore, the shape of the trapping canopy is no way limited to the cylindrical shape depicted in FIG. 17. For example, in some embodiments, the trapping canopy has the shape of a dome, a rectangular tube, or a tiered columnar shape.

In particular embodiments, a substrate material containing microelectrodes embedded thereon, as described above, is connected to or functions as part of the means for collecting evolved gases. For example, in some embodiments, a substrate material containing a plurality of microelectrodes embedded thereon serves as a wall (i.e., side) or portion thereof of a tube or column that functions to collect an evolved gas. In the foregoing embodiment, the microelectrodes on the substrate are necessarily positioned with their catalytically active portions facing into the collection tube. During operation, the tube typically also includes the electrolyte in order for gas formation to occur inside the tube. In a particular arrangement, the substrate material containing a plurality of microelectrodes embedded thereon is itself embedded in or otherwise disposed on a wall of the gas collecting tube. For example, in some embodiments, one or a plurality of substrates (e.g., silicon wafers), each containing a plurality of microelectrodes embedded thereon, are attached to or embedded in the surface of the collecting tube or column.

The electrolysis apparatus described above also includes electrical powering means for providing electrical power to each of the plurality of microelectrodes and one or more counter electrodes. The electrical powering means includes all of the features and devices known in the art for transmitting an electrical current to an electrical device. Generally, for the purposes of the instant invention, several of the electrical powering features are on the microscale in order to properly engage each of the microelectrodes. Some examples of features and devices that are typically included to electrically power the microelectrodes include wiring and electrical bonding pads, any of which can be lithographically imprinted on the substrate along with the microelectrodes. Other common electrical elements can be included, such as electrically conducting traces, rectifiers (e.g., diodes), resistors, capacitors, power conditioning elements, transistors (e.g., MOSFETs), and any of the other elements used in integrated circuits, such as microprocessors and other elements used in SSI, MSI, VLSI, and ULSI integrated circuit technologies. In some embodiments, the electrically conducting traces or other wiring are made of a superconducting material.

In one set of embodiments, power is provided to each of the microelectrodes by direct electrical connection (i.e., wiring) between the power source and microelectrodes. The direct electrical powering means includes features for controlling electrical power characteristics, such as any of the current and voltage characteristics known in the art. In some embodiments, all of the microelectrodes are collectively powered and adjusted, i.e., the microelectrodes are not independently powered and adjusted, and thus, not independently addressable. In other embodiments, each of the microelectrodes is independently addressable, i.e., each microelectrode can be independently powered or turned off, and each powered microelectrode can be independently electrically adjusted.

In another set of embodiments, the microelectrodes are wirelessly powered. Any of the wireless technologies known in the art are applicable herein, as appropriately modified to suit the particular requirements of the instant invention. For example, the microelectrodes can be configured to be in electrical communication with a receiving coil, wherein the receiving coil includes means (i.e., features) that allow it to produce appropriately conditioned electrical power from a wireless transmission source (e.g., a transmitting coil). As known in the art, the transmission source is generally required to be within an optimal size, distance and orientation to the receiving coil in order for efficient wireless transmission to occur. In some embodiments, the wireless transmission source is a coil that can inductively couple to a receiving coil to produce a current in the receiving coil. In other embodiments, the wireless transmission source produces a form of electromagnetic radiation, such as provided by a radio or microwave source. The source of electromagnetic radiation can be converted to an electrical current by a suitable rectifying antenna (i.e., rectenna) capable of converting electromagnetic energy into electrical energy. In other embodiments, a receiving coil and rectenna are both used. In particular embodiments, each microelectrode or group of microelectrodes is provided with its own independent means for being wirelessly powered. Any of the wireless features described above can be incorporated into the substrate, along with microelectrodes, by any of the lithographic or photolithographic means known in the art, such as those described above. Generally, the wireless powering mechanism is used solely for powering of the microelectrodes while not having a direct effect on the electrolysis of water, i.e., electromagnetic radiation used in the instant process for energy transfer or communication is preferably not also inducing the splitting of water by photolysis. In particular embodiments, photolysis means are excluded from the instant electrolytic apparatus and/or process. In related embodiments, a radiofrequency plasma source is excluded from the instant electrolytic apparatus and/or process.

In other embodiments, the electrical powering means can further include features for monitoring the performance of each microelectrode. For example, by incorporation of appropriate electrical detection devices known in the art, voltage and current levels of each microelectrode can be monitored and appropriately adjusted. Integrated computer chips can also be incorporated into the microelectrode design in order to regularly monitor and/or adjust the electrical power of each microelectrode. In some embodiments, the computer chips are programmed by an appropriate algorithm to keep each of the microelectrodes within certain current and/or voltage limits during performance. The computer chips may also detect malfunctioning or non-optimal performance of a microelectrode and transmit this information to an external source, such as a computer, for further evaluation by a process control operator.

In another set of embodiments, the microscaled electrodes, described above, are not included, but the same or similar benefits of microscaled electrodes are instead provided by modifying a bulk metal electrode to include on its surface a plurality (i.e., distribution) of microsized or nanosized high energy points (i.e., catalytic hot spots). In the foregoing embodiment, the distribution of catalytic hot spots functionally mimics a patterned array of microelectrodes. In particular embodiments, random catalytic hot spots are built into a bulk electrode by appropriate adjustment of catalyst grain size and domain structures during manufacture of the catalyst. In other methods, a distribution (either ordered or random) of protrusions are built into the bulk catalyst by, for example, a physical or chemical etching process, or by a physical and/or chemical additive process (e.g., by a PVD or CVD process). Some of the possible specific means for introducing these features in a bulk catalyst are provided by techniques discussed in, for example, B. Glowacki, et al., *Materials World*, vol. 6, no. 11, pp. 683-686 (November 1998), the contents of which are incorporated herein by reference in their entirety. In some embodiments, the techniques of metallography and crystallography are used to characterize the microstructures of the electrode materials as a guide for the next iteration in the preparation on an improved electrode. To determine if a suitable or desired distribution of catalytic hot spots has been achieved on the electrode, the electrode material can be tested for electrolytic bubble distribution on the surface of the electrode.

Catalytic hot spots can be defined as the points of oxygen or hydrogen bubble formation on a bulk metal electrode. It is known in the art that the surface area occupied by the hot spots is a small percentage of the geometric area of the bulk electrode (e.g., E. Greenbaum, et al. "Metabolic Prosthesis for Oxygenation of Ischemic Tissue," *IEEE Trans. Biomed. Engin.*, 56, 528-531 (2009)). It is also known in the art that electronic conduction in polycrystalline materials depends on the size, structure and distribution of the grain boundaries of the crystallites (e.g., Springer Handbook of Electronic and Photonic Materials by Safa Kasap and Peter Capper (2006)). Materials and their grain boundary characteristics can be designed with improved electronic performance and in some cases smart capabilities to provide more reliable electronic devices and systems with improved functionality. For example, in a material containing grain boundaries, charge carriers are generally scattered at the interfaces between grains. By careful design of grain boundaries, this scattering can be made useful. Obstructing or diverting the flow of electrons by grain design allows the control of microelectronic pathways in the bulk material leading to, for example, a statistically uniform distribution per unit area of catalytic hot spots on the surface of the bulk electrodes. This distribution can functionally mimic a patterned array of microelectrodes.

At least one possible advantage of using such a modified bulk electrode in lieu of an array of microelectrodes is the ability to dispense with the wiring or wireless communication typically employed in managing an array of microelectrodes. Furthermore, the same advantages provided by an array of microelectrodes (i.e., dispensing of an ion-permeable barrier) is also applicable in this embodiment.

Still other modifications are possible for replacing an array of microscaled electrodes with a functional mimic of an array of microscaled electrodes. For example, in another embodiment, the functional mimic of the array of microelectrodes can be provided by modifying a bulk catalytic electrode to contain on its surface a coating (e.g., a hermetic insulating layer) that contains a distribution of microscaled openings therein, thereby permitting the bulk catalyst to make contact with the electrolyte only at the openings in the coating. The porous coating can be adhered to the bulk catalyst by any suitable method. For example, a suitable insulating porous (i.e., macroporous, microporous, mesoporous, or nanoporous) film can be affixed to the surface of the bulk catalyst, or a portion thereof, by methods known in the art (e.g., by a heat bonding or lamination process). Alternatively, an insulating coating may be applied to the surface of the catalyst by means well known in the art, and this followed by a hole patterning process by means known in the art. In the foregoing embodiment, the distribution of microscaled openings functionally mimics a patterned array of microelectrodes. Again, at least one possible advantage of using such a modified bulk electrode in lieu of an array of microelectrodes is the ability to dispense with the wiring or wireless communication employed in managing an array of microelectrodes. As with the previous embodiment, the same advantages provided by an array of microelectrodes (i.e., dispensing of an ion-permeable barrier) is also applicable in this embodiment.

In some embodiments, the above two embodiments which employ a functional mimic of microelectrodes do not include microelectrodes for any electrode, i.e., for electrode and counter-electrode. In other embodiments, at least one electrode is configured as a functional mimic electrode, described above, while one or more other electrodes (for example, one or more counter electrodes) contain an array of microelectrodes, according to any of the embodiments described above. In yet other embodiments, at least one electrode is configured as a functional mimic electrode, described above, while one or more other electrodes are bulk electrodes of the art.

The electrolysis apparatuses described above also include a container for holding an aqueous electrolyte and housing the anode and cathode. The container may be an integral, separate, or detachable component of the electrolytic apparatus. In embodiments where a partition separates the anode and cathode, as described above, the partition may be an integral (i.e., permanent and non-removable) or detachable element of the container. In embodiments where at least one of the electrodes is comprised of a substrate containing microelectrodes embedded thereon, the substrate can function as an integral or detachable element of the container. The means for collecting evolved gases may also be an integral or detachable element of the container.

In addition to the above-described features of the electrolysis apparatus, the apparatus typically includes means for the entry and exit of the aqueous electrolyte, particularly for the purpose of replenishing the aqueous electrolyte. In some embodiments, one or more fluid-transporting conduits (e.g., hoses or pipes) integrally or detachably connected to the container are included in the apparatus. In some embodiments, the container includes at least one built-in inlet and at least one built-in outlet for this purpose.

In other aspects, the invention is directed to a method of producing hydrogen and oxygen gases by operating any of the electrolysis apparatuses described above. In the method, an electrolyzer, as described above, is charged with an aqueous electrolyte, and the electrolyzer electrically powered to produce hydrogen and oxygen gases by the electrolytic splitting of water. In some embodiments, the aqueous electrolyte is pure water, i.e., water in the substantial absence of ionic species, or with trace amounts of an ionic species, as would be obtained by purifying water via filtration, reverse osmosis, and/or distillation. A trace amount of ionic species is typically an amount in which the water remains relatively non-conductive (e.g., up to or less than 0.1, 0.01, or 0.001 S/m), which may correspond to a salt concentration of or less than, for example, 0.1, 0.05, 0.01, 0.001, or 0.0001 mM of the ionic species. In other embodiments, the aqueous electrolyte includes a sufficient amount of ionic species to make the water appreciably conductive, e.g., a conductivity of over 0.1 S/m, or at least 0.2, 0.5, 1, 1.5, 2, 2.5, 3, 3.5, 4, 5, 10, 50, or 100 S/m.

In some embodiments, the ionic species is a salt. The salt can be essentially any salt that is soluble in water, and preferably, completely soluble (e.g., up to 5, 10, 20, 50, or 100 g/L), in water. In some embodiments, the salt is non-metallic, such as an ammonium hydroxide or ammonium halide salt. The non-metallic salt can also be organic (e.g., tetramethylammonium hydroxide). In other embodiments, the salt is a metal salt, such as a metal hydroxide, metal halide (e.g., metal fluoride, chloride, bromide, or iodide), metal nitrate, metal chlorate, metal perchlorate, or metal acetate. Some examples of metals that can be included in the metal salt include the alkali metals (e.g., Li, Na, K), alkaline earth metals (e.g., Mg, Ca, Sr), non-reactive transition metals (e.g., Mn, Fe, Co, Zn), and non-reactive main group metals (e.g., Al, Ga). In some embodiments, one or more of any of the above classes or specific types of ionic species are excluded from the aqueous electrolyte.

In some embodiments, the ionic species is basic, such as any of the hydroxide salts described above. In other embodiments, the ionic species is acidic. Some examples of acidic ionic species include any of the organic and inorganic acids known in the art, such as acetic acid, hydrochloric acid, nitric acid, sulfuric acid. In other embodiments, the ionic species can include a superacid, such as trifluoromethylsulfonic acid or a bis-(perfluoroalkylsulfonyl)imide acid, or an organic or metal salt thereof. The ionic species can also be any of the non-reactive ionic polymers or ionic liquids known in the art. In some embodiments, one or more of any of the above classes or specific types of ionic species are excluded from the aqueous electrolyte.

In some embodiments, the aqueous electrolyte includes only water as a solvent. In other embodiments, the aqueous electrolyte includes one or more water-soluble solvents. Some examples of water-soluble solvents include the alcohols (e.g., methanol, ethanol, isopropanol, or ethylene glycol), acetonitrile, ethers (e.g., dimethoxyethane), and polyalkyleneoxides (e.g., polyethyleneglycols). The solvent can serve, for example, as a surfactant to improve the efficiency of the process. If used for its surface wetting properties, the solvent can be included in an amount of up to, for example, 10, 5, 1, 0.5, or 0.1% by weight or volume of the electrolyte.

In some embodiments, the electrolyzer is powered by a conventional (i.e., non-renewable) power source, such as electricity emanating from a conventional power plant or battery, wherein the battery may be rechargeable. In other embodiments, the electrolyzer is electrically powered by a renewable power source. Some examples of renewable electrical power sources include solar energy (i.e., electricity produced from a solar cell), hydroelectric, wind, and geothermal energy. In other embodiments, the electrolyzer is powered by a process in which excess or byproduct thermal energy is produced. The process producing an excess or byproduct amount of thermal energy can be, for example, an industrial manufacturing process or a nuclear power plant.

In some embodiments, any of the electrolytic methods described above for producing hydrogen and/or oxygen is coupled to one or more processes that utilize hydrogen and/or oxygen gas. By being coupled to one or more processes that utilize hydrogen and/or oxygen gas, the electrolytic apparatus can be physically connected to one or more process operations where hydrogen and/or oxygen is utilized such that hydrogen and/or oxygen gas is transported directly from the electrolyzer into the one or more process operations. Alternatively, the electrolytic method can be coupled to one or more processes although the electrolytic apparatus is not physically connected to one or more of the process operations. For example, hydrogen and/or oxygen produced by the electrolytic apparatus can be collected in a container and transported to one or more process operations to be used therein.

In a first set of embodiments, the electrolytic method described above is coupled to a Fischer-Tropsch (FT) process for the synthesis of liquid hydrocarbons (generally, of the formula $C_nH_{2n+2}$). As known in the art, the Fischer-Tropsch process can be conveniently described by the following set of reactions:

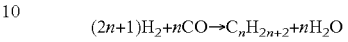
$$(2n+1)H_2 + nCO \rightarrow C_nH_{2n+2} + nH_2O$$

The numerous conditions typically employed in the FT process (e.g., catalysts, temperatures, and pressures) are well-known in the art. According to methods of the art, hydrogen for the FT process is typically provided by gasification of a carbonaceous feedstock, most commonly coal gasification (i.e., $3C + H_2O + O_2 \rightarrow H_2 + 3CO$). Since the $H_2/CO$ molar ratio generally produced by coal gasification processes is about 0.7, as compared to the ideal $H_2/CO$ molar ratio of 2 for FT processes, the $H_2/CO$ molar ratio produced by coal gasification processes is typically further adjusted by the water-gas shift reaction (i.e., $CO + H_2O \rightarrow CO_2 + H_2$). However, the water-gas shift reaction is an energy intensive process requiring high temperatures and the use of copious amounts of metal catalyst. Therefore, at least one advantage in coupling the instant electrolysis process with the FT process is that hydrogen produced from the instant electrolysis process can be mixed into a syngas feedstock mixture produced by coal or biomass gasification to increase the $H_2/CO$ ratio while not relying on a water-gas shift reaction for this purpose.

In a second set of embodiments, the electrolytic method described above is coupled to a petroleum refining process. Of particular focus according to the instant invention are those petroleum refining operations that require hydrogen gas. Some examples of such petroleum refining operations include hydrodealkylation, hydrodesulfurization, and hydrocracking operations. The numerous conditions typically employed in the foregoing petroleum refining operations (e.g., catalysts, temperatures, and pressures) are well-known in the art.

In a third set of embodiments, the electrolytic method described above is coupled to a Haber process for the production of ammonia. As known in the art, the Haber process can be conveniently described by the following overall reaction:

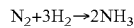
$$N_2 + 3H_2 \rightarrow 2NH_3$$

The numerous conditions typically employed in the Haber process (e.g., catalysts, temperatures, and pressures) are well-known in the art. The Haber process is relied upon for producing millions of tons of fertilizer per year. Thus, millions of tons of hydrogen gas are needed to sustain the Haber process. Currently, hydrogen gas used in the Haber process is provided by gasification and steam reforming of fossil fuels. Since fossil fuels are non-renewable, and gasification and steam reforming of fossil fuels are environmentally detrimental and costly, the instant embodiment is quite beneficial by providing large quantities of hydrogen gas from a renewable source (i.e., water) and without relying on fossil fuels in sustaining the Haber process.

In a fourth set of embodiments, the electrolytic method described above is coupled to a hydrogenation process. The hydrogenation process can be any process that uses hydrogen gas. For example, the hydrogenation process can be a coal liquefaction process for the production of liquid hydrocarbons. As known in the art, the coal liquefaction process can be conveniently described by the following overall set of reactions:

$$nC+(n+1)_2 \rightarrow C_nH_{2n+2}$$

The numerous conditions typically employed in the coal liquefaction process (e.g., catalysts, temperatures, and pressures) are well-known in the art, e.g., the Bergius process. Other hydrogenation processes well-known in the art include the hydrogenation of unsaturated compounds, as found in the conversion of maleic acid to succinic acid, and the conversion of unsaturated fats to saturated fats.

Several other processes can make use of the hydrogen gas produced by the electrolytic process described above. For example, current large-scale methanol production generally relies on the reaction between carbon dioxide and hydrogen, wherein the hydrogen is conventionally obtained by steam reforming of methane. Hydrogen chloride (HCl) production also requires large amounts of hydrogen (i.e., by reaction of hydrogen and chlorine gases). Thus, both of these processes would also benefit by the instant hydrogen production process.

A particular process that may benefit in utilizing oxygen produced by the electrolytic process described above is the smelting of iron ore into steel. Other processes that may benefit include metal cutting and welding processes and equipment, as well as water treatment processes.

In other aspects, the invention is directed to a method for producing species other than hydrogen or oxygen using the electrolytic apparatus described above. Species other than hydrogen and oxygen can be obtained by suitable selection and adjustment of the aqueous electrolyte, as well as appropriate adjustment of the operational characteristics of the microelectrodes (e.g., current, voltage, and catalytic characteristics).

In a particular set of embodiments, the electrolytic method described above is modified to function as a chloralkali process. As known in the art, the chloralkali process occurs by the electrolysis of an aqueous solution of a metal chloride, $M^{+y}Cl_y$, where y is at least 1 and up to 6, but more typically 1 or 2. At the anode, chlorine ($Cl_2$) is produced by the oxidation of chloride anion (along with minor production of oxygen gas), i.e., according to the half-reaction: $2Cl^- \rightarrow Cl_2 + 2\ e^-$. At the cathode, hydroxide ion is produced by the reduction of water to hydrogen according to the following half-reaction: $2H_2O + 2e^- \rightarrow H_2 + 2\ OH^-$. Metal ions (i.e., $M^{+y}$) migrate from the anode to the cathode to form metal hydroxide species (i.e., $M^{+y}(OH)_y$, where y is as defined above). Generally, the metal ion (i.e., $M^{+y}$) considered herein is a hard metal ion with a low propensity for being reduced. Thus, the overall reaction may be conveniently expressed as follows: $M^{+y}Cl_y + y\ H_2O \rightarrow y/2\ Cl_2 + y/2\ H_2 + M(OH)_y$.

Some particular types of metal ions (i.e., $M^{+y}$) considered herein include the alkali metals (e.g., $Li^+$, $Na^+$, $K^+$), alkaline earth metals (e.g., $Mg^{+2}$, $Ca^{+2}$, and $Sr^{+2}$), as well as transition and main group metals that are resistant to reduction (e.g., $Zn^{+2}$ and $Sn^{+2}$). In particular embodiments, the metal chloride is sodium chloride, and thus, the metal hydroxide produced at the cathode is sodium hydroxide, as shown in the following overall equation:

$$2NaCl + 2H_2O \rightarrow Cl_2 + H_2 + 2NaOH$$

Typically, an ion-permeable or ion-conducting membrane is used in the chloralkali process to prevent mixing of chlorine and hydroxide since these species are reactive with each other to produce, for example, hypochlorite ($ClO^-$) and chlorate ($ClO_3^-$) species. The ion-permeable or ion-conducting membrane will selectively allow only positive ions (e.g., metal ions and protons) to pass into the cathode compartment. However, in embodiments where hypochlorite or chlorate is desired as an endproduct, a membrane may not be used, or a partition that permits mixing (as described above) is used. As known in the art, the relative amount of chlorine compared to chlorine oxide species is also dependent on the pH and operating temperature. For example, it is known that, while chlorine is generally the predominant component at low pH (i.e., less than 7), hypochlorous acid (HClO) is generally the predominant component at neutral pH (i.e., about 7), and hypochlorous acid ion ($ClO^-$) is generally the predominant component at high pH (i.e., above 7, and more generally, at or above 9). Furthermore, elevated temperatures are known to favor the formation of chlorate over hypochlorite when mixing is permitted. Other numerous conditions typically employed in the chloralkali process (e.g., electrode compositions, metal-halide concentrations, and the like) are well-known in the art. For example, it is well known that, due to the corrosive nature of chlorine produced at the anode, the anode should be made of a material unreactive with chlorine, such as any of the non-reactive electrode materials described above, and in particular, titanium or titanium alloys with other catalytic electrode materials. Moreover, it is generally known that a particularly suitable cathode material for the chloralkali process is nickel or a nickel alloy. In particular embodiments, the chloralkali process described above is electrically powered by a renewable energy source or a source producing excess or byproduct heat, as described above.

In yet another aspect, the invention is directed to a process in which the above-described chloralkali process is coupled to a process that uses chlorine gas or a metal hydroxide produced by the chloralkali process. Some examples of processes that use chlorine gas include a variety of industrial processes for producing chlorinated chemicals (e.g., solvents, insecticides, and plastics). Some examples of processes that use metal hydroxides, and sodium hydroxide in particular, include processes for producing lye formulations, paper, alumina, detergents, and a variety of organic salt compounds (e.g., carboxylate salts). Sodium hydroxide, in particular, is also used in oil drilling (e.g., as a component in drilling mud) and fuel manufacturing operations (e.g., to remove sulfurous contaminants).

FIG. 1a is an embodiment of a two-compartment modular structure for the electrolytic production and separation of hydrogen and oxygen. Element 2 is the hydrogen production compartment. Element 4 is the oxygen production compartment. Element 6 is a common wall that separates the two compartments. Element 8 is a wafer electrode assembly embedded in the common wall 6. Element 10 is a primary transmission coil that powers 8 via Faraday's law of electromagnetic induction. Separate streams of hydrogen and oxygen are collected via the exit ports at the top of their respective collection towers.

As illustrated in FIG. 1a, in particular embodiments, silicon planar wafers are included in a membrane barrier to produce $H_2$ and $O_2$ in separate compartments. Photolithography is used to lay down the pattern of bond pads, electric current-carrying traces and electrodes. A polymer or metal oxide coating provides an electrically insulating barrier between the wafer, electrical traces, and the water. The insulating coating is removed from the face of the electrodes to expose only the portions that are needed to contact the water for the electrolytic reactions. Electrodes on the wafers may be powered by direct bond pad connections, or as depicted in FIG. 1a, wirelessly via inductively coupled power transmission.

As also shown in FIG. 1a, $H_2$ and $O_2$ collection towers are sized to minimize pressure differences between their respective collection compartments. The towers may be operated above atmospheric pressure according to principles embodied in the Nernst equation. If powered by inductive coupling, the $H_2$ and $O_2$ collection towers are self-contained, free-standing units located in close proximity to the transmitting coils.

Figure 1B:
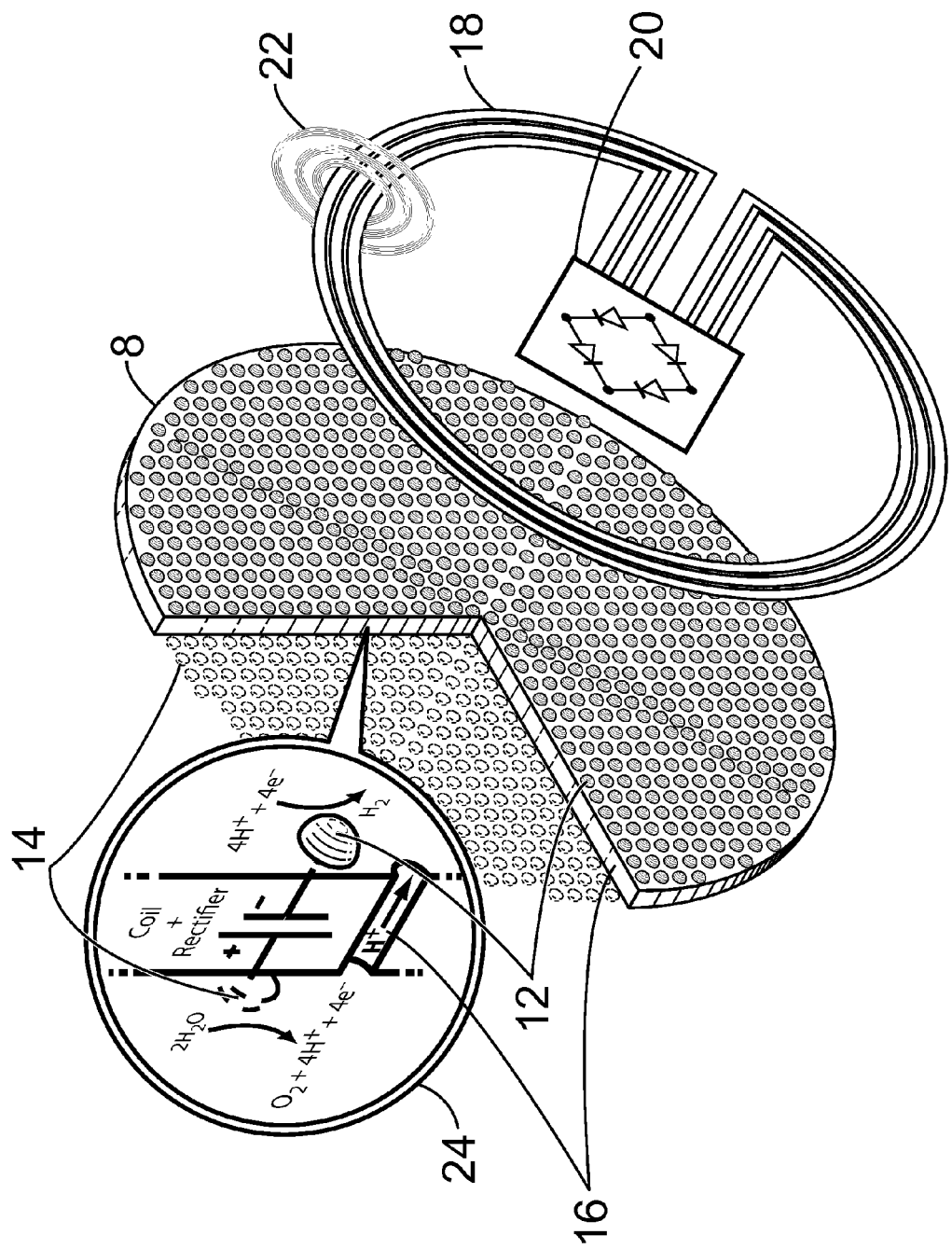

FIG. 1b is a detailed view of the wafer electrode assembly 8 shown in FIG. 1. Elements 12 are patterned cathodes on the first surface of the wafer. Elements 14 are corresponding patterned anodes on the second surface. Through vias, perpendicular to the surface, connect each cathode-anode pair to a voltage source that powers the electrolysis of water. Elements 16 are pores (holes) that allow the movement of ions between the two sides of the wafer. In particular, 16 facilitates maintenance of electroneutrality on both sides of the wafer as electrolysis proceeds. Element 18 is the secondary receiving coil that receives power from the primary transmitting coil 10 (as indicated in FIG. 1a). For clarity, 18 is shown in an "exploded" view above the surface of the wafer. In practice, 18 is on or close to the surface of the wafer. Secondary receiving coil 18 may be fabricated as part of the lithography process, or it may be a separately prepared coil that is added to the wafer. Element 20 is the power-conditioning block that generates the DC voltage for electrolysis. In addition to wireless power, bidirectional information wireless telemetry 22 is used to monitor and control the operating conditions of the wafer such as the current and voltage parameters of each electrode. Element 24 is an inset to FIG. 1b as further shown in FIG. 2, and as discussed below.

Figure 2:
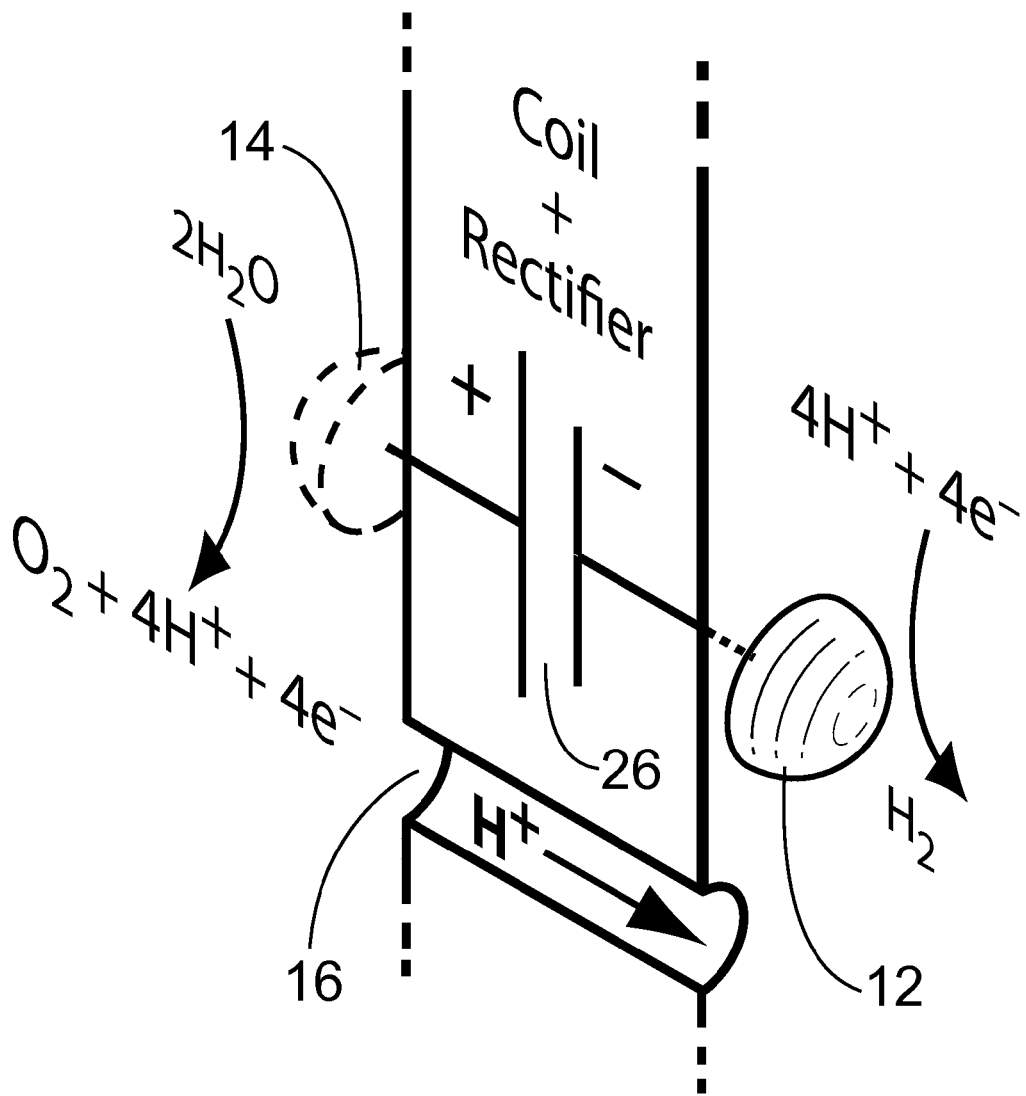
FIG. 2. Illustration depicting a proton-conducting pore in relation to the electrodes.

FIG. 2 is an inset to FIG. 1b providing a detailed view of hydrogen production at cathode 12, oxygen production at corresponding anode 14, and maintenance of electroneutrality on both sides of the wafer via the migration of hydrogen ions through pore 16. As illustrated in FIG. 2, in particular embodiments, electroneutrality between the $H_2$ and $O_2$ collection compartments is maintained by proton-conducting micro- or nano-channels in close proximity to the patterned electrodes. Element 26 is a voltage means for powering the electrolysis of water.

Figure 3:
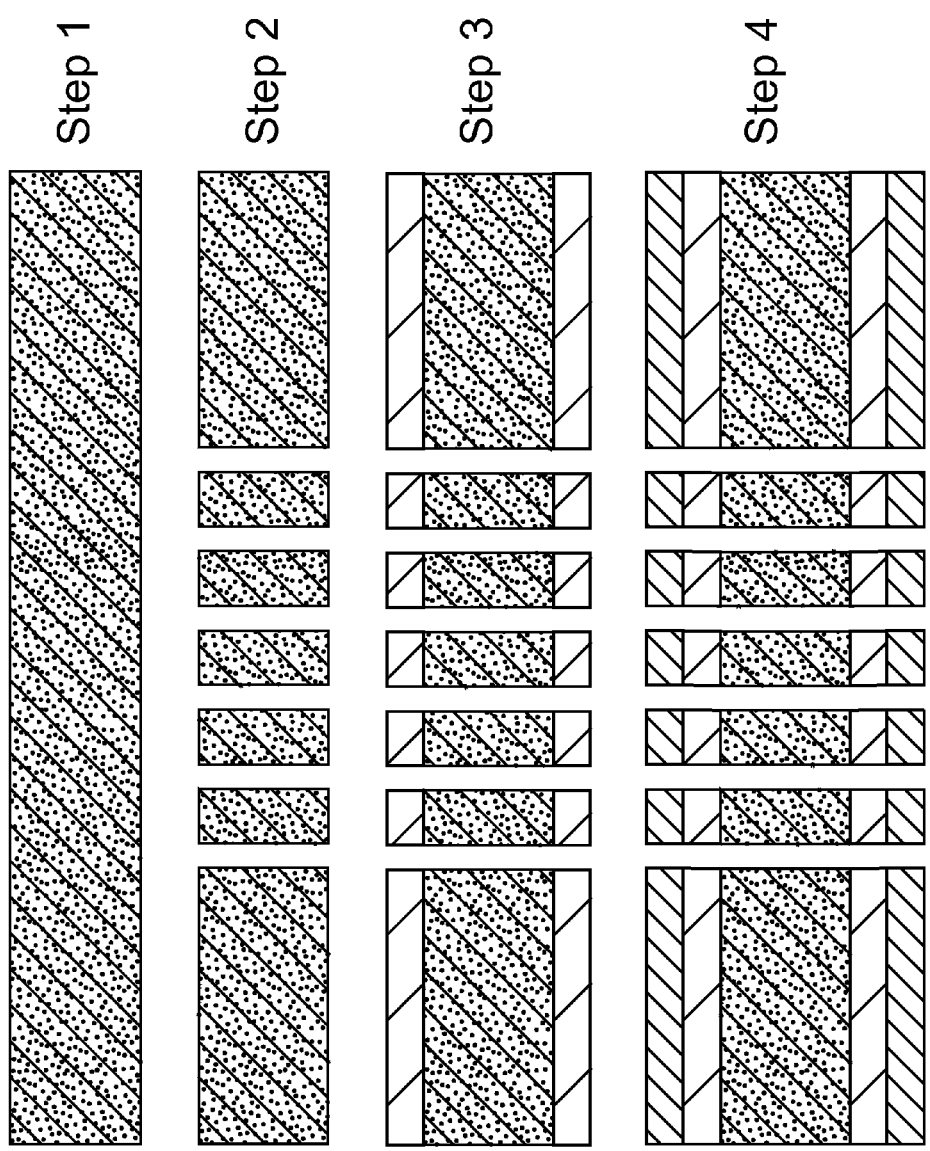
FIG. 3. Schematic showing an exemplary process in the preparation of a microelectrode-pore system on a semiconducting substrate. Step 1, semiconducting substrate; Step 2, lithographically define and etch pores; Step 3, oxidize semiconducting wafer, or atomic layer deposition; Step 4, evaporate metal, i.e., lithographically define or shadow.

FIG. 3 illustrates an exemplary set of process steps that can be used for wafer preparation. In the exemplary process, silicon wafers (e.g., two-inch diameter, 50 μm thick) can be used as substrates. The wafers are preferably characterized using a variety of imaging and microscopy techniques including atomic and Kelvin force microscopies. If desired or found necessary, protective polymer coatings, such as parylene, can be applied.

To fabricate the through vias or pores, standard nanofabrication processes can be used. FIG. 3 demonstrates a particular fabrication process. As shown in FIG. 3, first, the thin silicon substrate (~50 microns), as shown in Step 1 of FIG. 3, is lithographically patterned to produce structure of Step 2 in FIG. 3. Through vias can be reactive-ion etched using a deep silicon reactive ion etch system capable of the so-called Bosch etch process as well as cryogenic etching. Next, the etched substrate is oxidized, preferably in an $O_2$ or $H_2O$ atmosphere, to create a thin insulating barrier as shown in structure of Step 3 in FIG. 3. Finally, as shown in structure Step 4 in FIG. 3, electrodes can be deposited via physical vapor deposition (evaporation or sputtering) using an off-axis orientation to shadow the through vias. The electrodes can be subsequently patterned using a lift off process or standard lithography/etch process (not shown).

For rising bubbles under laminar flow conditions, the cross migration of $H_2$ and $O_2$ is typically negligible. For example, if the height of the collection tower in FIG. 1a is 10 meters, the maximum escape time for the bubbles can be calculated as 40 seconds. On the other hand, for an aqueous path length of 1 mm, the characteristic diffusion time for oxygen is 254 seconds. Moreover, oxygen is not especially soluble in water, i.e., 284 μM at 20° C. and 1 atm. It is even less soluble in electrolytes because of the well-known "salting-out" effect. See, for example, Davis et al, "Solubility and Diffusion Coefficients of Oxygen in Potassium Hydroxide Solutions", *Electrochimica Acta*, 12, 287-297 (1967), the contents of which are herein incorporated by reference in their entirety. Experiments can be performed to measure the degree of cross-migration and the onset of turbulence. For example, working with wafers produced in Step 3 of FIG. 3, experiments can be performed with pores (e.g., of 1, 3, 10, 30, 100 and 500 μm diameters) in conjunction with the test assembly shown in FIGS. 4a and 4b, which illustrate the wafer, pores, and opposing 100 μm diameter wire electrodes with adjustable distances from the surfaces of the wafer.

Visual inspection has shown that bubble formation can be divided into at least two phases. At low currents (e.g., <1 mA), the bubbles grow at the electrode surface, break free and ascend in a quiescent laminar stream. However, at significantly higher currents (e.g., >1 A), the bubbles tend to burst forth violently, causing turbulence and cross-contamination of the product streams. Increasing the size of a single electrode does not alleviate the problem because the gases are produced at catalytic "hot spots," and not uniformly across the surface as a geometric representation of the electrode would suggest. In some embodiments, the current provided to each microelectrode is kept below a threshold current in order to prevent or minimize turbulence that could cause cross contamination. For example, in different embodiments, depending on several factors including the size and design of the microelectrodes, the threshold current can be at or below, for example, 1 A, 500 mA, 250 mA, 100 mA, 50 mA, 25 mA, 10 mA, 5 mA, 1 mA, 0.5 mA, 0.25 mA, or 0.1 mA, or within a range bounded by any two of the foregoing values.

If desired or found necessary to further ensure the prevention of cross-contamination, the pores can be modified with a proton-conducting polymer. The use of a proton-conducting polymer can also permit an increased threshold current for cross-migration of $O_2$, or even allow operation without limitation by a threshold current altogether. Pores can be modified with a proton-conducting polymer by methods known in the art. For example, precursor chemicals, such as bifunctional silanes (as commercially available from, for example, Gelest, Inc.) can be used to attach a proton-conducting polymer to a semiconducting substrate surface. In some embodiments, the bifunctional silanes contain or are modified to contain proton-exchange groups. Bifunctional silanes containing proton-exchange groups can be the same bifunctional silanes used in preparing silica-based ion-exchange resins, which are used in, for example, chromatography and water purification.

In a first set of embodiments, the pore modification process includes direct coating of a porous silicon or silica material (or other oxide or semiconductor material) with a bifunctional silane containing or further modified to contain proton-exchange groups on a free end, i.e., the end not bound to the substrate (see, for example, Arkles, B. (1977) Tailoring Surfaces with Silanes, *Chemtech*, 7, pp. 766-778, the contents of which are incorporated herein by reference in their entirety). In a second set of embodiments, the pore modification process includes filling pores with proton-conductive "brush" copolymers that are attached to the silicon surface with bifunctional silanes (see, for example, Yameen, B., et al., (2008) *J. Am. Chem. Soc.*, 130, pp. 13140-13144). In a third set of embodiments, the pore modification process includes filling membrane pores with porous xerogels containing proton-exchange functionalities imparted by grafting or encapsulation, such as by infusion of silica sol gels and proton-exchange polymers into the pores (see, for example, Gautier, C., et al. (2006) *Langmuir*, 22, pp. 9092-9095, and Pichonat, T., et al. (2006) *Microsyst. Technol.*, 12, pp. 330-334, the contents of which are incorporated herein by reference in their entirety). Synthesis of such silica-sol-based xerogels is made relatively straightforward by the availability of inexpensive, commercially available precursors and their ease of preparation.

A wide range of materials can be incorporated using any of the approaches described above (see, for example, Laughlin, J. B., et al. (2000) *J. Chem. Educ.*, 77, pp. 77-79, the contents of which are incorporated herein by reference in their entirety). The brush-copolymer method, in particular, increases potential proton-exchange capacity and selectivity by increasing the number of proton-exchange groups per silicon surface area of the pores. In particular embodiments, the pore modification process can include the encapsulation of Nafion 117 or other proton-exchange polymer in porous (e.g., mesoporous) silica by sol gel condensation of tetramethylorthosilicate.

In accordance with a particular aspect of the invention, modern methods of integrated circuit technology are used to produce an electrolytic system having wireless power and information transfer. The production and operation of electronic circuitry in aqueous environments is well known in the art. See, for example, D. Zhou and E. Greenbaum (Eds.), *Implantable Neural Prostheses*, Vol. 1 (2009) and Vol. 2 (2010), Springer, New York. An electrolytic system particularly under consideration herein contains a planar electroactive structure that contains one or more electrolytic electrode pairs, a coil for receiving power and information, power conditioning circuits, and electronic circuitry for bidirectional information transfer between the electroactive electrodes and a process control center for controlling and optimizing the production of hydrogen and oxygen. However, not all of the foregoing features need to be used. For example, there may be certain applications where wireless power or bidirectional telemetry is not needed.

The planar electroactive structure could be a silicon wafer of an appropriately chosen diameter. A selection of diameters in the range of 2-12 inches are commercially available. Integrated circuits on the silicon wafers are designed to perform the electrolysis of water. The wafer and its associated electronics are preferably hermetically sealed except for appropriate exposure of the electrocatalytic surfaces of the electrodes on either side of the wafer that will evolve the hydrogen and oxygen. In particular embodiments, the planar structure of the wafer forms a barrier that facilitates separation of the hydrogen and oxygen that are formed on opposite sides of the wafer barrier. Microelectrodes can be embedded on each side of the wafer barrier. In particular embodiments, electrode pairs formed of electrodes on opposite sides of the wafer draw separate power from a power source, such as a rectenna. Additional wireless circuitry can be included to collect information about the productivity of each electrode pair and to control the current and voltage levels of each electrode pair.

In some embodiments, the hermetically protected wafer is sealed in the wall of a rectangular tubular structure, whose geometry, with interior and exterior regions, lends itself to the collection of the hydrogen and oxygen. Multiple silicon wafer units can be sealed in one or more walls of the tubular structure. Power transmitting coils are appropriately designed and positioned to maximize mutual inductance and power transfer between the transmitting coils of the power source and the receiving coils of the wafers. This modular tubular unit, with multiple wafers, can be scaled-up for large-scale hydrogen and oxygen production.

Figure 6:
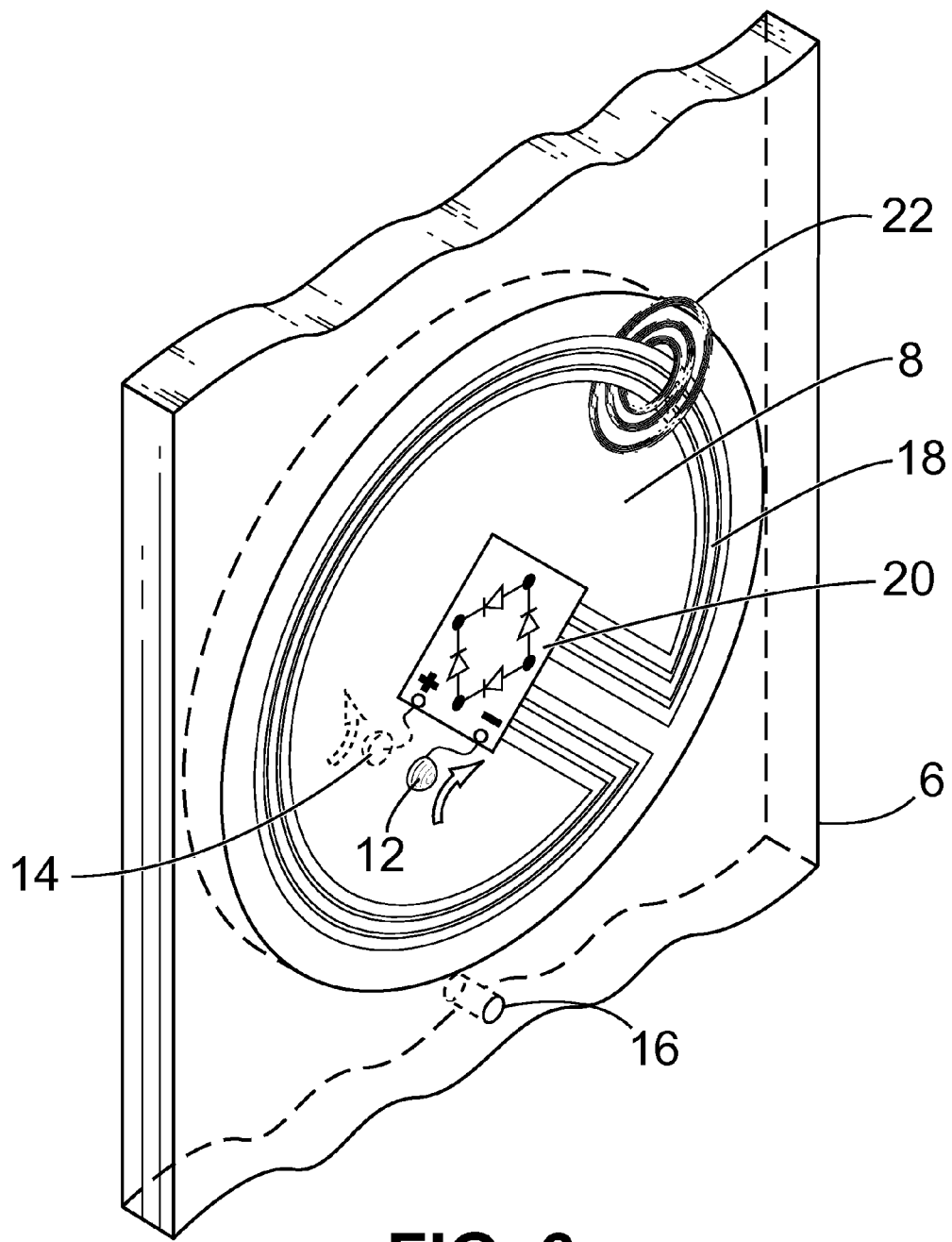
FIG. 6. Perspective view of an embodiment in which a silicon wafer containing at least one microelectrode on each side is sealed in the wall of a dual gas-collection tube.

FIG. 6 is a perspective detailed view of the electrolysis of water according to an embodiment of the present invention. FIG. 6 illustrates an embodiment where a silicon wafer electrode assembly 8 is sealed in the wall 6 of a two compartment gas-collecting rectangular tube (i.e., "rectangular tube"). In FIG. 6, common wall 6 contains embedded wafer electrode assembly 8. Element 12 is a cathode (or a plurality of cathodes) on the first side of the wafer. Element 14 is an anode (or a plurality of anodes) on the second side of the wafer. Element 16 is a pore (or a plurality of pores) for maintaining electroneutrality. In FIG. 6, pore 16 is illustrated in the common wall. In other embodiments it is in the wafer. In yet other embodiments, multiple pores are present in both the wafer and wall. Electrical contact on the opposite side of the wafer is preferably achieved using electrical conducting means perpendicular to the plane of the wafer. One example of such means is through silicon via technology which is well known in the art (see, for example, U.S. Pat. Nos. 7,683,459 and 7,633,165). Element 18 is the secondary receiving coil that receives power from the primary transmitting coil (not shown). Element 20 is the power-conditioning block that generates the DC voltage for electrolysis. Bidirectional information wireless telemetry 22 is used to monitor and control the operating conditions of the wafer, such as the current and voltage parameters of each electrode.

The silicon wafer shown in FIG. 6 contains cathode and anode microelectrodes on opposite sides of the wafer, and the microelectrodes are in electrical communication with a power source that will drive the electrolysis. The rectangular tube forms enclosures (see FIG. 1a) that separates a first volume where hydrogen can be produced from a second volume where oxygen can be produced. Water is on both sides of the common wall and is in contact with the electrolytic electrodes. At least one pore maintains electroneutrality during electrolysis. The power transmitting coil sends power to a rectenna, which contains the receiving coil and the power conditioning electronics. Rectennas are well-known devices that receive power in the form of electromagnetic energy and convert them to usable electrical power. The rectenna schematically illustrated in FIG. 6 is comprised of a receiving coil and power block that conditions the electrical power for electrolysis. This conditioning generally includes rectification and smoothing. Additional electronics, not illustrated, may also be present. For example, bidirectional electronic control circuitry can be included to monitor, control, and set the current and/or voltage levels of each electrolytic electrode pair. This is accomplished with bidirectional telemetry between the data of the electrodes and control units that interact wirelessly with each electrode pair that is involved in electrolysis. Although FIG. 6 illustrates only one such pair, many electrolytic electrodes can be present on the silicon wafer, each with its own control electronics and power. The current and voltage values are generally determined by the plant manager in order to suitably adjust or optimize operation of the system. Current and/or voltage can be increased or decreased to likewise increase or decrease hydrogen and/or oxygen output, and to stay within electrode operating limits. The wafer is preferably hermetically sealed except for the electrode, which refers to the electrocatalyst surface on which the electrolysis of water occurs.

It is well known in the art of wireless power transmission that close distances and proper orientation optimize overall efficiency. Thus, in some embodiments, the interior area of the tubing is occupied by the transmitting coil which is placed in close proximity to the receiving coil because this will maximize power transfer.

Multiple silicon wafers can be sealed in the wall. If the cathodes are facing a first compartment of the tubing, hydrogen will be collected in that compartment. Hydrogen gas can then be captured and used as needed. In some embodiments, several such wafers are embedded, each with a multiplicity of electrodes for performing the electrolysis of water simultaneously.

FIG. 6 shows one possible way that the silicon wafer can be sealed in the wall of the rectangular tube. One mode of operation is for hydrogen to be produced internally and oxygen to be produced externally of the rectangular tube. The wafer is preferably hermetically sealed with a non-conducting polymer except for exposure at the catalytic portion that electrolyzes water to hydrogen and oxygen.

Figure 8:
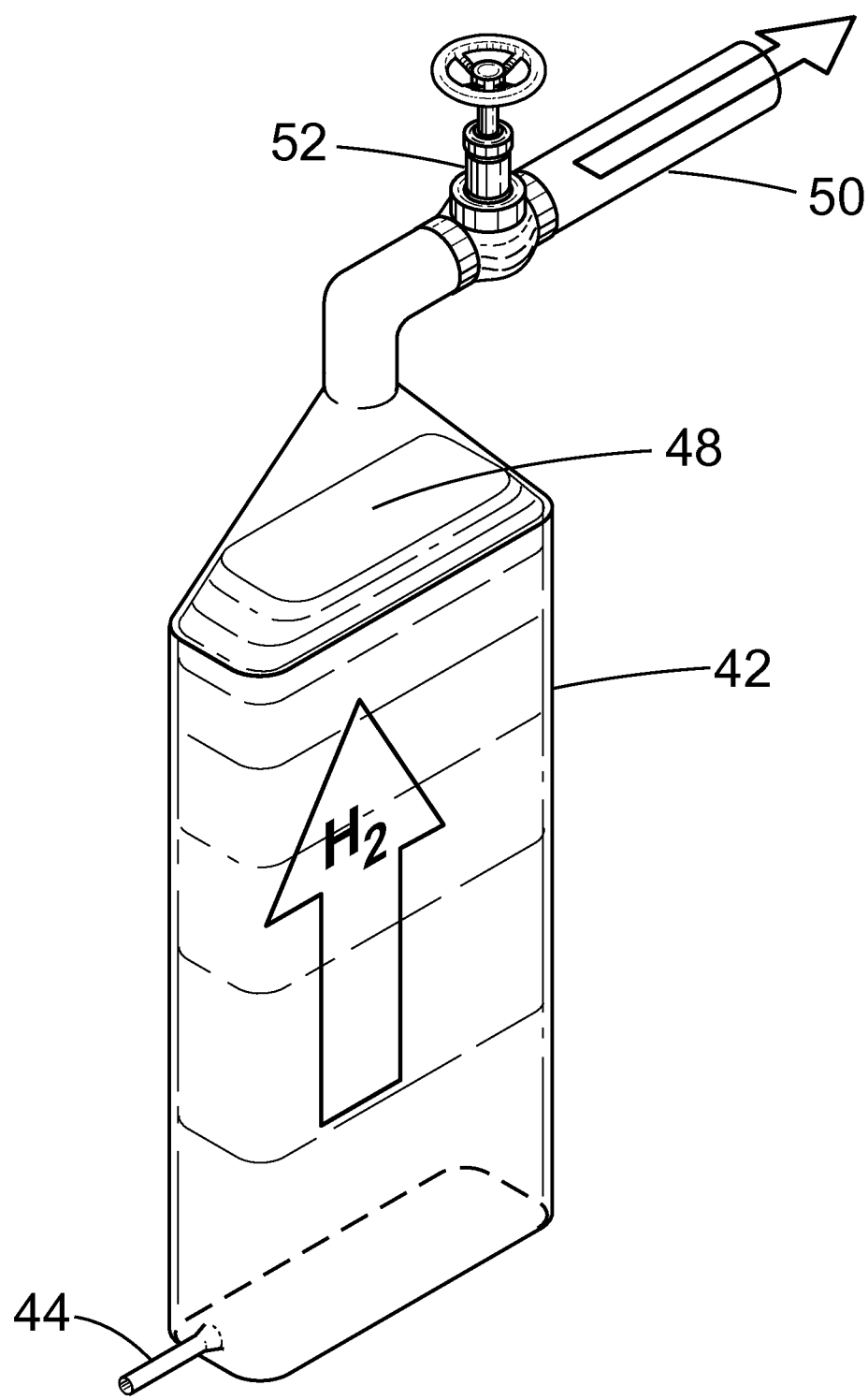
FIG. 8. Simplified view showing how hydrogen may be collected when it is produced in the interior of a tubular structure.

FIG. 8 is a simplified illustration of how the hydrogen can be collected. The transmitting coils, wafer, and other elements are omitted from the figure for simplicity. Element 42 is the hydrogen compartment. Element 44 is the feed tube to provide replacement for the water consumed in the electrolytic process. Hydrogen bubbles rising in the compartment reach headspace 48. Hydrogen is removed from the headspace via tube 50 that is part of a network for product collection. Shutoff valve 52 can be used to isolate the electrolytic tower from the collection network for quick removal and servicing or replacement. In order for hydrogen or other gas to be collected in the tube, the cathode (or anode) faces the interior of the tube so that gas is produced inside the tube. For example, hydrogen produced in the interior of the tubular structure can be collected by capping the top, collecting it, and sending to a compressor for storage or distribution. Water (i.e., aqueous electrolyte) is generally on both sides of the tube. The oxygen may also be collected, or alternatively, vented to the atmosphere. The shut-off valve can be used to disconnect the unit from the piping network for quick maintenance or replacement.

In some embodiments, the tubular structures are multiple free standing units that are packed relatively closely to minimize floor space. Such a packing arrangement can help to optimize hydrogen and oxygen output per unit area. Depending on the output of produced gas and other variables, the tubular structures can be columns of average to massive lengths and diameters (e.g., up to 5, 10, 20, 30, 40, 50, or 100 feet). The tops of the tubular units generally transition into a piping system that enables capture of hydrogen and/or oxygen. If hydrogen is produced in the interior of the tube, gas capture becomes relatively easy. If desired, both hydrogen and oxygen can be captured by modifying the collection and piping system.

Figure 9:
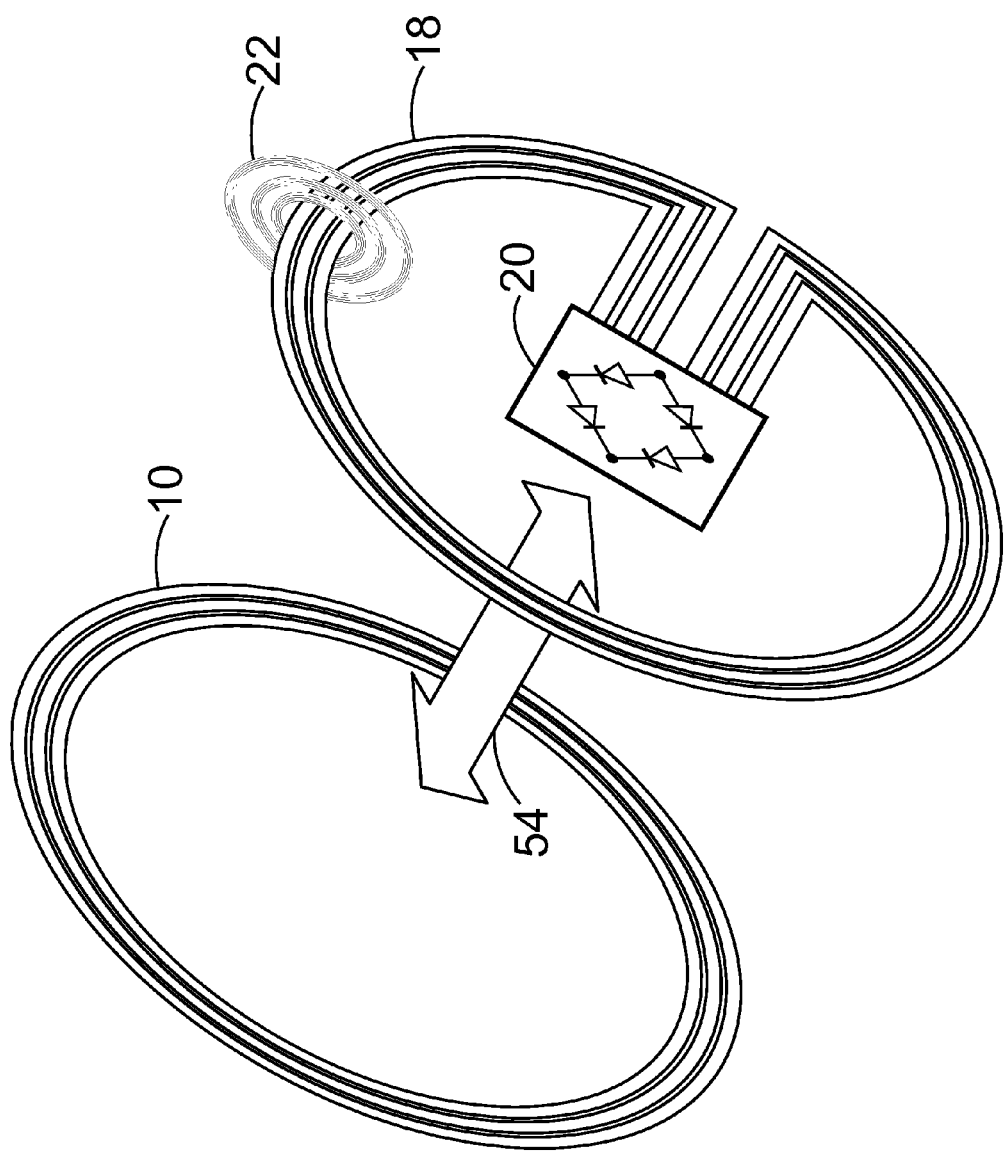
FIG. 9. Illustration showing a possible arrangement of transmitting and receiving coils when the plane of the receiving coil is parallel to the plane of the wafer.

FIG. 9 illustrates one possible arrangement for transmitting and receiving coils where the planes of the receiving and transmitting coils are parallel and close to each other with collinear axes. Only the coils are shown. In FIG. 9, element 18 is the secondary receiving coil that receives power from the primary transmitting coil 10. Element 20 is the power-conditioning block that generates the DC voltage for electrolysis. In addition to wireless power, bidirectional information wireless telemetry 22 is used to monitor and control the operating conditions of the wafer such as the current and voltage parameters of each electrode. 54 is electromagnetic energy that is transferred from the primary transmitting coil to the secondary receiving coil. Coils 10 and 18 are positioned and oriented to maximize energy transfer.

The geometry shown in FIG. 9 is advantageous for maximizing power transfer. This arrangement is particularly useful if the design of the wafer-rectenna system has the receiving coil parallel to the wafer since it maximizes the flux linkages between the two coils.

The invention can be further appreciated by a further detailed discussion of its component elements. For example, in particular embodiments, a silicon wafer with an appropriate diameter is chosen. In one embodiment of the invention, the wafer is powered inductively by its receiving coil that is located in close proximity to the transmission coil. The receiving coil can be made as part of the integrated circuit process or it can be a coil that is manufactured separately and affixed to the wafer. Faraday's Law of Electromagnetic Induction teaches that maximum power is transferred to the device when the time rate of change of magnetic flux linkage through the receiving coil is maximized. Distance and orientation between the coils are important parameters that enter into the value of mutual inductance. Two convenient orientations suggest themselves. If the receiving coil is fabricated so that it is either in or closely parallel to the plane of the silicon wafer, then a corresponding location for the transmitting coil would be one that is in close proximity to the receiving coil, concentric and parallel to it. Alternatively, the receiving coil may be oriented perpendicular to the plane of the wafer that is sealed in the wall of the cylindrical tubing. Correspondingly, the axis of the receiving coil is collinear with the central axis of the tubing. A favorable geometry for this configuration is for the axis of the transmitting coil to be collinear with the other axes and placed inside the receiving coil.

For large-scale hydrogen and oxygen production, power delivery by wireless telemetry has practical advantages for service and maintenance. The tubular towers will contain many embedded silicon wafers with each wafer containing many electroactive electrodes for the electrolysis of water. Each of these towers can be freestanding units that are not mechanically connected by wires to any source of power. In some embodiments, the only mechanical connection is the hydrogen collection device at the top of the tower. Using a shut-off valve and quick connect/disconnect fasteners, these towers can be removed from the system for maintenance and inspection without serious compromise of the overall production output.

Information on productivity, maintenance, and repair for each of the microelectrodes can be obtained via bidirectional wireless telemetry. The electronic circuitry on the silicon chip directs power to the plurality of electrolytic electrodes that are contained on the wafer. Since a particular embodiment of the process is to produce hydrogen and oxygen on opposite sides of the wafer, the fabrication process can include cathode and anode microelectrodes on opposite sides of the wafer. Ideally, each electrode or group of electrodes will have its own local power and electronic control system that measures the current through each electrode and the supply voltage that is used to drive the current. Information on these parameters can be sent wirelessly to a central computer that is programmed to monitor and control all of the microelectrodes in the system.

Zero current flowing in an electrode indicates failure for that electrode, but not for the system as a whole. Indeed, the productivity of any single electrode is preferably a small fraction of the total product yield. "Fault" is defined as the operational failure of a system component. "Defect" is defined as failure that is caused by substandard manufacturing. The system is, therefore, fault tolerant because total output is not seriously affected by the failure of a relatively small number of electrolytic electrodes. It is defect tolerant for certain classes of manufacturing defects such as small water leakage between the sealed silicon wafer and the tubing because proton conductivity is required to maintain electroneutrality during the manufacturing process.

The operation of large-scale hydrogen and oxygen production facilities using this system can be constructed from freestanding two- or three-compartment modular units. In some embodiments, a single unit is comprised of a rectangular water-impermeable insulating cylinder into which a plurality of electrolytic wafers has been inserted. The cathode sides of the wafers can, for example, face the interior of the cylinder. Hydrogen that is produced in the cylinder's interior can be collected at the top and sent to a storage or distribution system. Each electrode in the system preferably can have its own coded address. The status of each electrolytic electrode can be continually reported to a computer with database software that monitors the current and voltage state of each electrode and its product output. Service and maintenance information can also be collected and used to schedule these operations as needed.

Figure 7A:
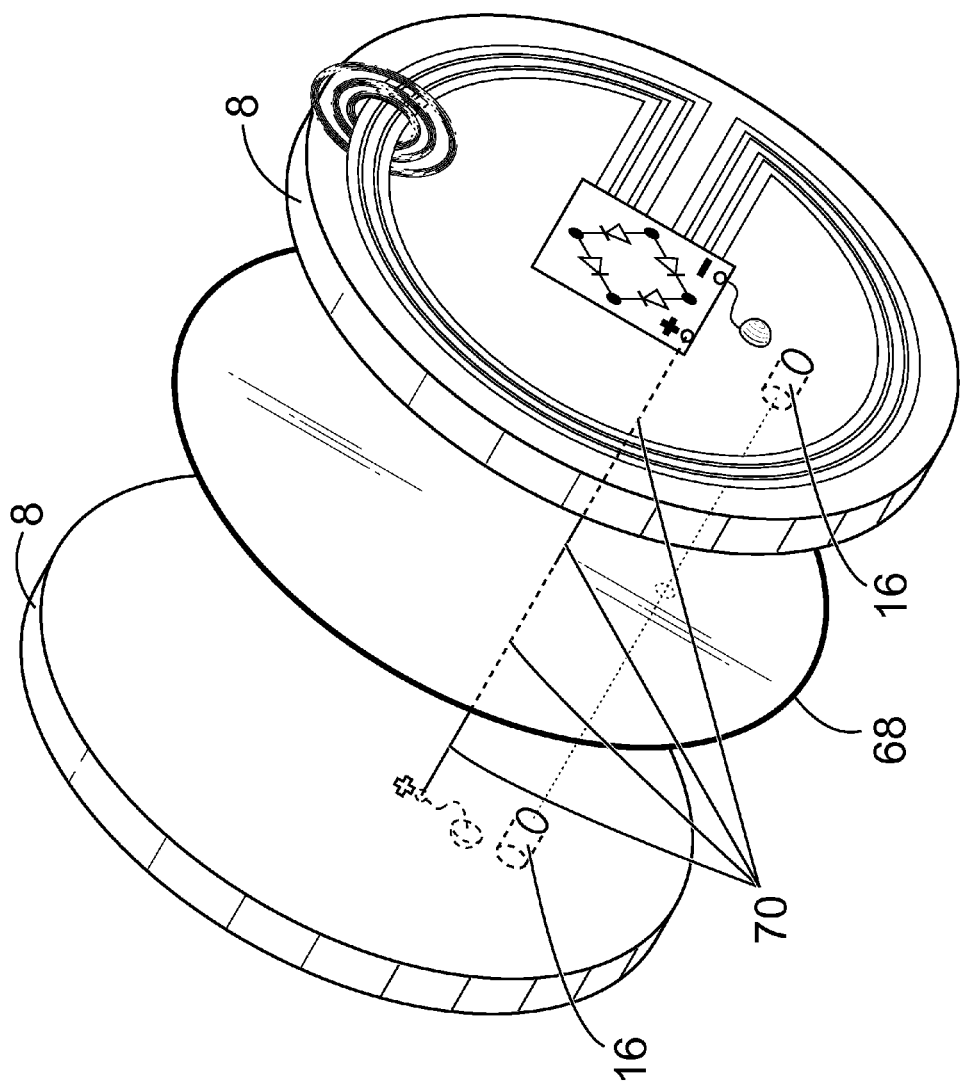
FIGS. 7a, 7b.
Figure 7B:
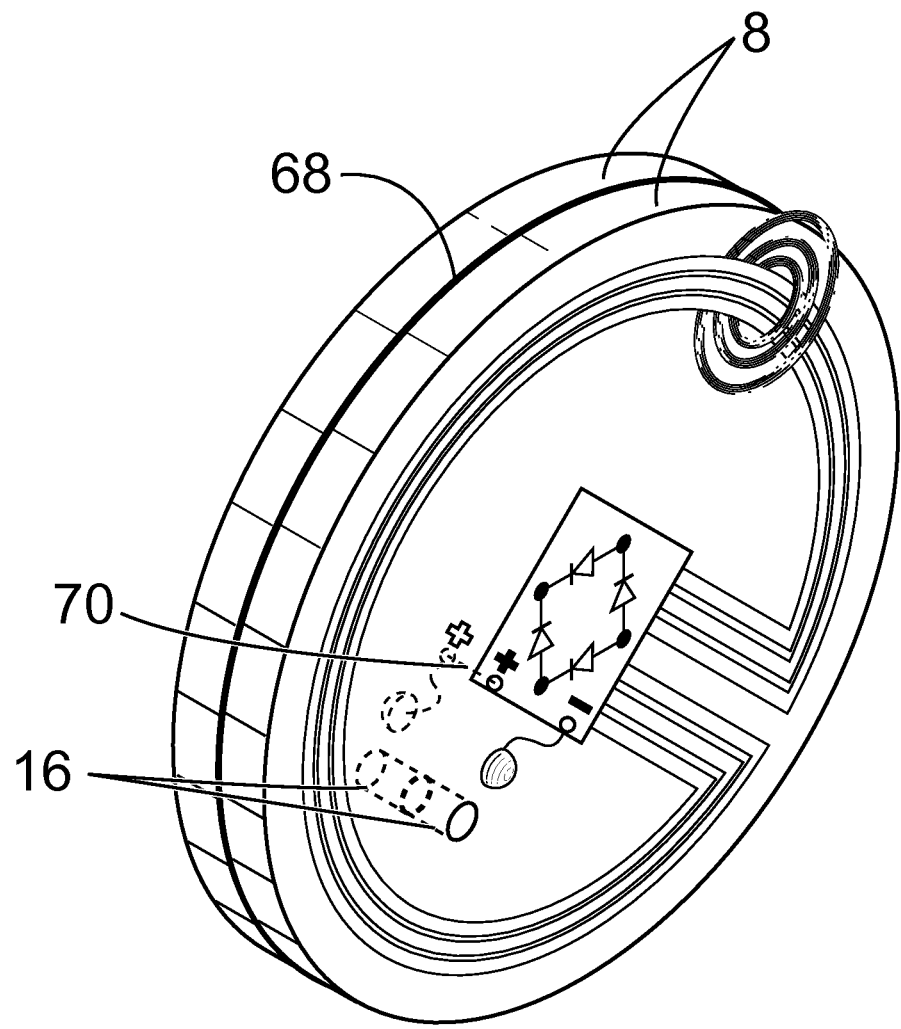

FIG. 7a is an exploded view of an embodiment (i.e., fourth embodiment, as described in the Summary section) in which two separate wafers 8 (i.e., first and second rigid planar substrates) sandwich a proton-conducting membrane 68. Elements 16 are pore sections (i.e., first and second pore sections) that, when the electrolyzer is assembled as shown in FIG. 7b, align colinearly at the point where they meet on opposite sides of the membrane 68. By being colinearly aligned, the central axes of the pore sections are substantially colinear, as shown in FIG. 7a. The point at which the pore sections 16 meet on opposite sides of the membrane 68 is depicted as the dotted circle shown on the membrane. Each pore section extends from the membrane 68 to at least the first planar surface of each wafer 8. Therefore, electrolyte is not allowed to directly transport from one end of the pore to the other, but instead, is stopped at the membrane which selectively allows passage of cationic species, such as protons. In some embodiments, the pore is level with the wafer surface, while in other embodiments, the pore extends a distance from the wafer surface (i.e., as a tubular element extending from the wafer surface). In some embodiments, each pore section is held tight against the membrane after assembly by being attached to the wafer and not to the membrane. In other embodiments, one or both pore sections are attached to the membrane. For a pore section that is attached to the membrane, the wafers can include an appropriately sized gap to fit the pore sections through the wafer during assembly. Generally, each pore section has the same or substantially the same internal diameter; however, in some embodiments, the pore sections have different widths, provided that the pore sections are substantially overlapping (i.e., substantially colinearly aligned) on opposite sides of the membrane. Although a single partitioned pore is depicted in FIGS. 7a and 7b, two, three, or a greater multiplicity of such pores can be included in the design.

In the foregoing (i.e., fourth) embodiment, the membrane contacts the second planar surface of each wafer, while the first planar surface of each wafer contains a plurality of microscaled catalytic electrodes. Thus, the first planar surface of each wafer is designed to be in contact with the electrolyte while the second planar surface of each wafer is designed to be in contact with the membrane. Since the second planar surface of each wafer is in contact with the membrane, the second planar surface of each wafer generally does not contain microelectrodes or other electronic devices disposed thereon. However, in certain embodiments, the second planar surface of one or both wafers may contain electronic devices or structures, such as any the devices and structures (e.g., bond pads, traces, etc.) described above. While FIGS. 7a and 7b depict a single wafer on each side of the membrane, other embodiments may employ multiple wafers on a solid planar substrate material, as described above.

Proton-conducting membrane 68, and/or pores filled with a proton-conducting polymer or gel, prevent bulk fluid flow across the assembly, thereby increasing the level of allowable currents for electrolysis and improving the purity of the hydrogen and oxygen streams. An advantage of the embodiment shown in FIGS. 7a and 7b is that this design includes some additional features (particularly the sectional pore) that help to ensure that electrolytic currents remain within operable limits of the system. Element 70 is an electrical conducting means running across the wafer electrode membrane assembly that allows powering electrode pairs on opposite sides of membrane 68.

FIG. 7b is an assembled view of FIG. 7a. Pores 16 align colinearly on opposite sides of the proton-conducting membrane 68 that is tightly sandwiched between the wafers. Current-conducting means 70 transmits electric current across membrane 68. In particular embodiments, one or more alignment features are included in the assembly package in order to ensure proper alignment of hydrolyzer elements, including electronic components and pore sections. The alignment features can include, for example, markers and/or snap-fit features.

Using any of the electrolytic apparatuses and processes described above, a sufficiently pure gas stream for most applications can be obtained. For example, the produced gas stream may contain a contaminant gas in an amount of or less than 20%, 10%, 5%, 4%, 3%, 2%, 1%, 0.5%, or 0.1%.

For quality assurance purposes, and to monitor the level of gas intermixing or contamination, if any, appropriate testing means can be employed. An exemplary testing arrangement is provided in FIG. 5. FIG. 5 is a view of a test wafer with a single microfabricated electrode that further demonstrates the utility of the present invention. Element 16 is a pore (or multiple pores) that maintains electroneutrality on both sides of the wafer. Element 36 is a cathode that is exposed to the electrolytic solution. Element 38 is an electrically conductive trace that is coated with an insulating layer. Element 40 is an electrical bond pad used to make contact with electrode 36. A corresponding anode, not illustrated, is on the opposite side of the wafer. It has been found that hydrogen and oxygen bubbles rising in laminar flow do not appreciably cross-migrate across the wafer, thereby maintaining good purity of their respective streams.

In some embodiments, one or more auxiliary means for splitting water, beyond the electrolytic means described above, can be included in the electrolytic apparatus and/or process. Some examples of these additional means include photolysis (e.g., radiofrequency or microwave), heating, and plasma devices and processes. In other embodiments, one or more such auxiliary means, or all such auxiliary means, are excluded from the instant electrolytic apparatus and/or process.

Examples have been set forth below for the purpose of illustration and to describe certain specific embodiments of the invention. However, the scope of this invention is not to be in any way limited by the examples set forth herein.

Example 1

Microelectrode System on Silicon Wafer Substrate

Figure 10:
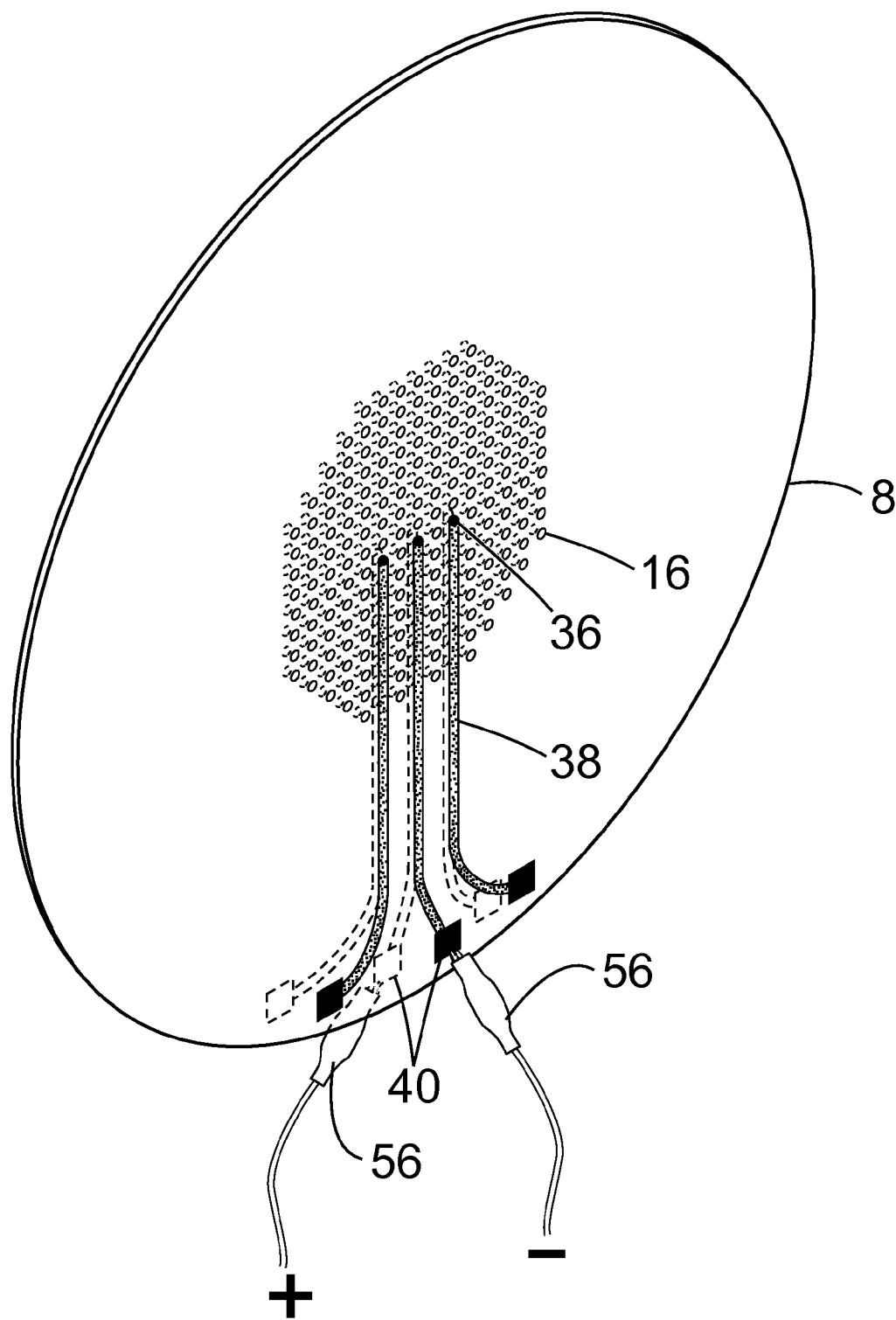
FIG. 10. Perspective illustration of a silicon wafer electrode assembly test structure, with photolithographed electrodes and etched pores, used for obtaining test data.

FIG. 10 is an illustration of a 4" diameter silicon wafer 8 with 500 μm diameter etched pores 16 on a 2 mm center-to-center grid. The thickness of the wafer is 500 μm. Three photolithographed cathodes 36 are illustrated on the near side of the water. Three photolithographed anodes (not visible in FIG. 10) are in mirror positions on the reverse side of the wafer. Electrically conducting traces 38 connect bond pads 40 to the cathodes and anodes on either side of the wafer. Bond pads 40 are less than a millimeter away from the circumference of the wafer. Traces 38 are coated with an insulating layer. Test clips 56 connect the bond pads to a constant current source In the experiments used to obtain the test data, the wafer of FIG. 10 is gasket-sealed in a two-compartment chamber. Electrolyte fills the chamber to a level above the pores 16. However, the bond pads 40 are not immersed in the electrolyte. They protrude beyond the gasket and are in dry air in the laboratory where electrical contact is easily made. The metal electrodes are exposed to the electrolyte. However, a film of silicon dioxide coats the non-electrode portion of the surface and shields it from the 10 mM KOH electrolyte.

Double-side polished 4" diameter, 500 micron thick, Si (100) n-type (p-doped) wafers were selected that had 1-5 ohm-cm resistivity. The wafers were thermally oxidized on both sides and the resulting 1.5 micron silicon oxide layer subsequently served as both the electrical contact insulation layer and an etch mask. First, the 1 mm diameter electrodes along with related conductive paths and contact pads were symmetrically patterned on both wafer sides using a backside alignment optical lithography and a lift-off process. A variety of metals, such as Pt, Ni, Fe, and Co, were e-beam evaporated in vacuum. The metal film thickness was typically between 100 to 250 nm. A 10 nm thin Cr adhesion layer was used with Ni, Fe, and Co. For Pt electrodes, a 10 nm Ti layer was utilized instead. After the lift-off process was completed, the wafers were cleaned in an oxygen plasma and spin-coated with an additional 7 micron thick layer of photo-resist. A second photolithography process was conducted to define an array of 1 mm (and/or 500 micron) diameter pores in the resist. The resist was post-backed for 90 seconds and the silicon surface was exposed (at the pore locations) to a silicon oxide plasma etch that was followed by a Bosch Si etch process that created vias through the entire 500 micron thick wafer. Normally, a thick photo-resist film was sufficient to finish the etch process. After the wafer was cleaned by hot NMP solvent and oxygen plasma, the ALD process was used to passivate both wafer surfaces with a 30 nm thick layer of silicon oxide. The 1 mm diameter electrodes and contact pads were left uncoated. The ALD technique was selected to also afford some degree of a protection to the inner sidewalls in the pores.

In FIG. 10, the test clips and wires that energize the electrodes approach the wafer, (oriented vertically) from the bottom. Gaskets on both sides of the wafer make a hermetic seal between the two glass chambers (FIG. 11) that hold the electrolyte and capture the electrolytically-produced hydrogen and oxygen.

Figure 11:
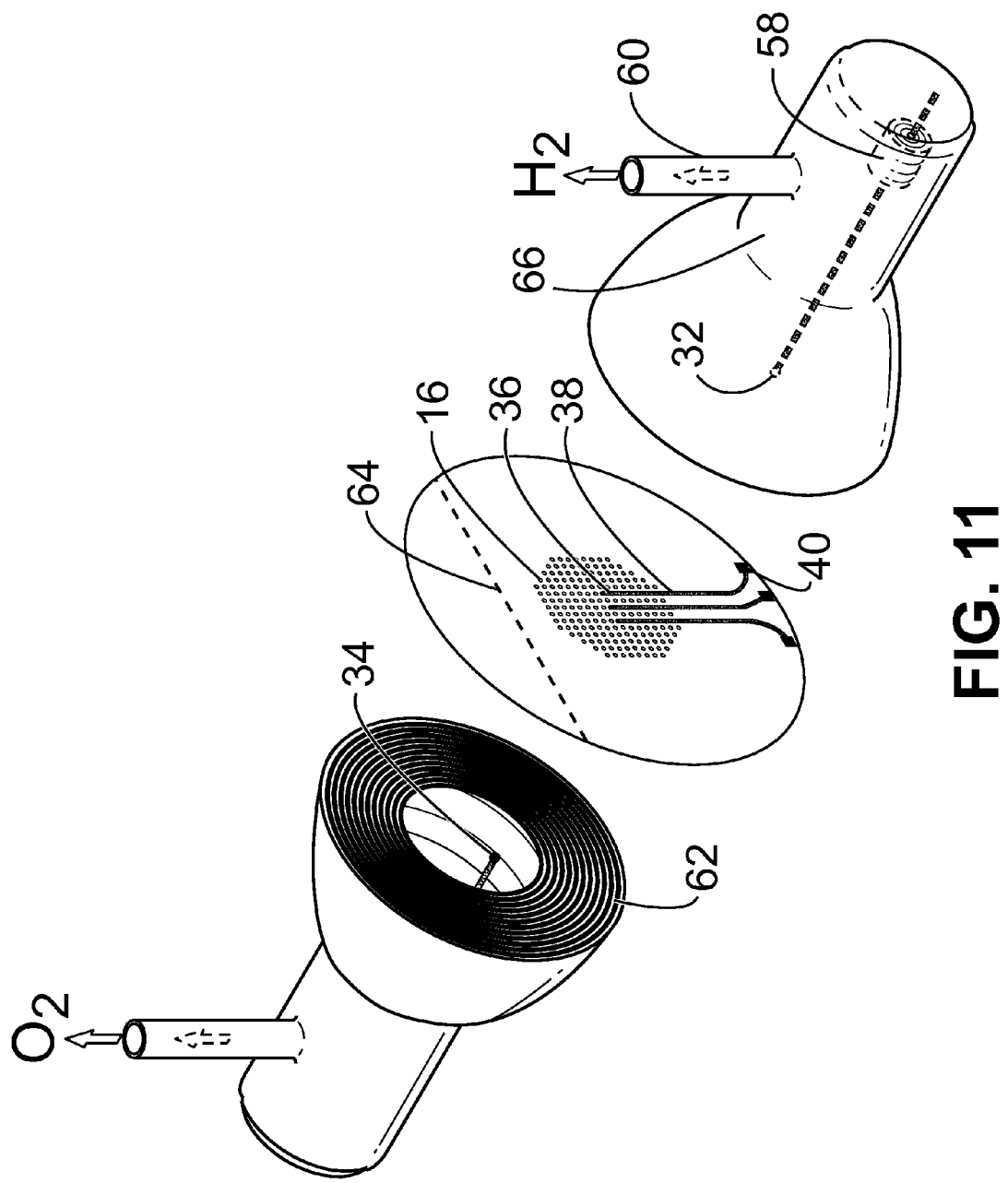
FIG. 11. Exploded view of test apparatus using a silicon wafer electrode assembly. Separate streams of hydrogen and oxygen are produced on opposite sides of the wafer.

FIG. 11 is an exploded view of the test apparatus. Electrolysis may be performed with cathode/anode pairs that are photolithographed on the wafer, as shown in FIG. 10, or with movable wire electrodes 32 and 34 that pierce their respective septa, such as 58. Gasket seals 62 on either side of the wafer are used to seal the wafer electrode assembly between two glass enclosures. The wafer becomes the common wall of a two-compartment chamber. Both compartments are filled with electrolyte to level 64 which is above the pores 16 and the opening in gasket 62. There is no gas-phase diffusion pathway between the chambers. The only diffusion pathway between the compartments for dissolved hydrogen and oxygen is in static liquid through the pores. Because the liquid is static and the electrolysis currents are chosen to avoid turbulence, there is virtually no convective flow between the chambers. Test leads from a constant current source make contact with the bond pads 40. Insulated traces 38 bring current to electrodes 36. Alternatively, insulated wires with electrolyte-exposed electrodes 32 and 34 used in conjunction with a wafer that has pores 16, but no patterned electrodes (not illustrated), and are positioned at the surfaces of either side of the wafer, may also be used. Bubbles of hydrogen and oxygen break free from their respective electrodes and rise in the electrolyte to the gas phase headspace 66 in their respective compartments where they escape and are measured and/or collected via the collection tubes 60. It is known in the art that the characteristic diffusion times for dissolved hydrogen and oxygen molecules in static liquid are much longer that the characteristic escape times for gas bubbles ascending in static liquids under the action of buoyant forces. These principles allow the production of separate streams of hydrogen and oxygen with good purity. All pores in FIG. 11 are submerged beneath the liquid level of the electrolyte. Gas in the headspace provided a diffusion pathway to sample the gases in the electrolyte headspace that were transported by a nitrogen carrier stream to hydrogen and oxygen sensors located on the hydrogen (cathode) side of the cell. The bond pads at the bottom of FIG. 11 cleared the gasket allowing for electrical contact with the electrical power supply as indicated in FIG. 10.

Example 2

Test Run Data for the Microelectrode System

Figure 12:
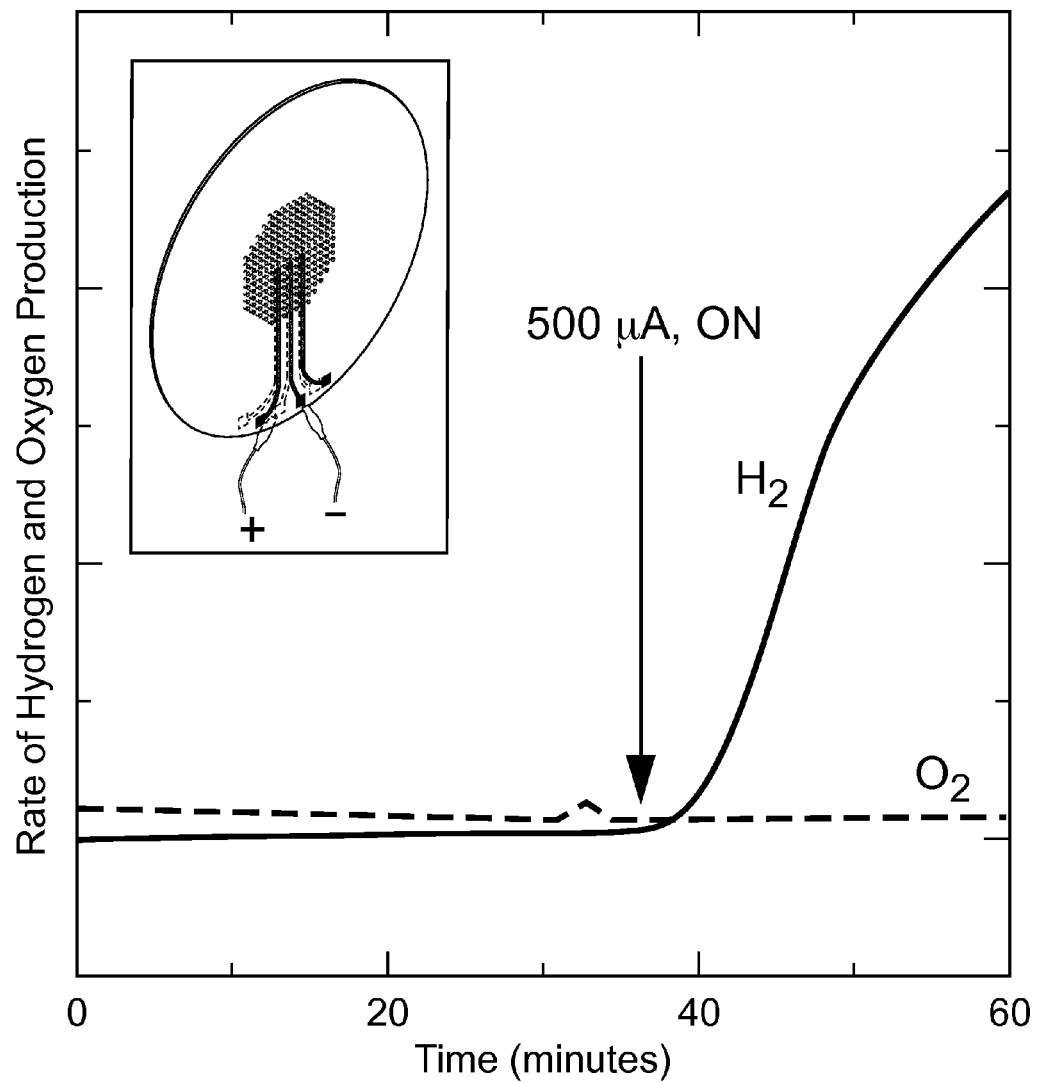
FIG. 12. Graph showing rate of electrolytic hydrogen and oxygen production from photolithographic patterned nickel microelectrodes on both sides of a four inch silicon wafer when an electrolytic current of 500 μA was discharged through a microelectrode cathode/anode pair.

FIG. 12 shows the data for a test run on the microelectrode system described in Example 1. A 500 µA current was applied to the center pair of electrodes for the wafer of FIG. 10, which is also illustrated in the inset to the figure. The experiment began by sparging the system with high-purity nitrogen to eliminate dissolved atmospheric oxygen from the electrolyte. This provided the initial zero baseline for the hydrogen and oxygen detectors. The nitrogen flow was then turned off, thereby providing a quiet, static electrolyte in both chambers. Baseline data (at 0 µA) were recorded for about 37 minutes, as shown in FIG. 12. The carrier gas that transported $H_2$ and $O_2$ to the sensors flowed above the headspace and did not disturb the quiescent liquid in the chambers. Calibrated hydrogen and oxygen detectors were both located on the hydrogen side of the wafer. The rate of hydrogen production from the 500 µA current was observed using a tin-oxide semiconductor sensor for gas phase hydrogen detection that is known in the art. The oxygen detector was a Hersch electrogalvanic cell, known in the art for gas phase oxygen detection. This gas-phase $O_2$ sensor can detect the oxygen production from a 5 µA electrolysis current. The oxygen response in FIG. 12 was less than 5 µA, thus indicating that the content of oxygen in the hydrogen stream was less than 1%.

Although the presence of oxygen gas in the hydrogen gas stream was <1%, dissolved $O_2$ is present in the electrolyte. Deliberate introduction of turbulence in the cell with the nitrogen flow causes easily detectable cross-migration of oxygen into hydrogen compartment.

Figure 13:
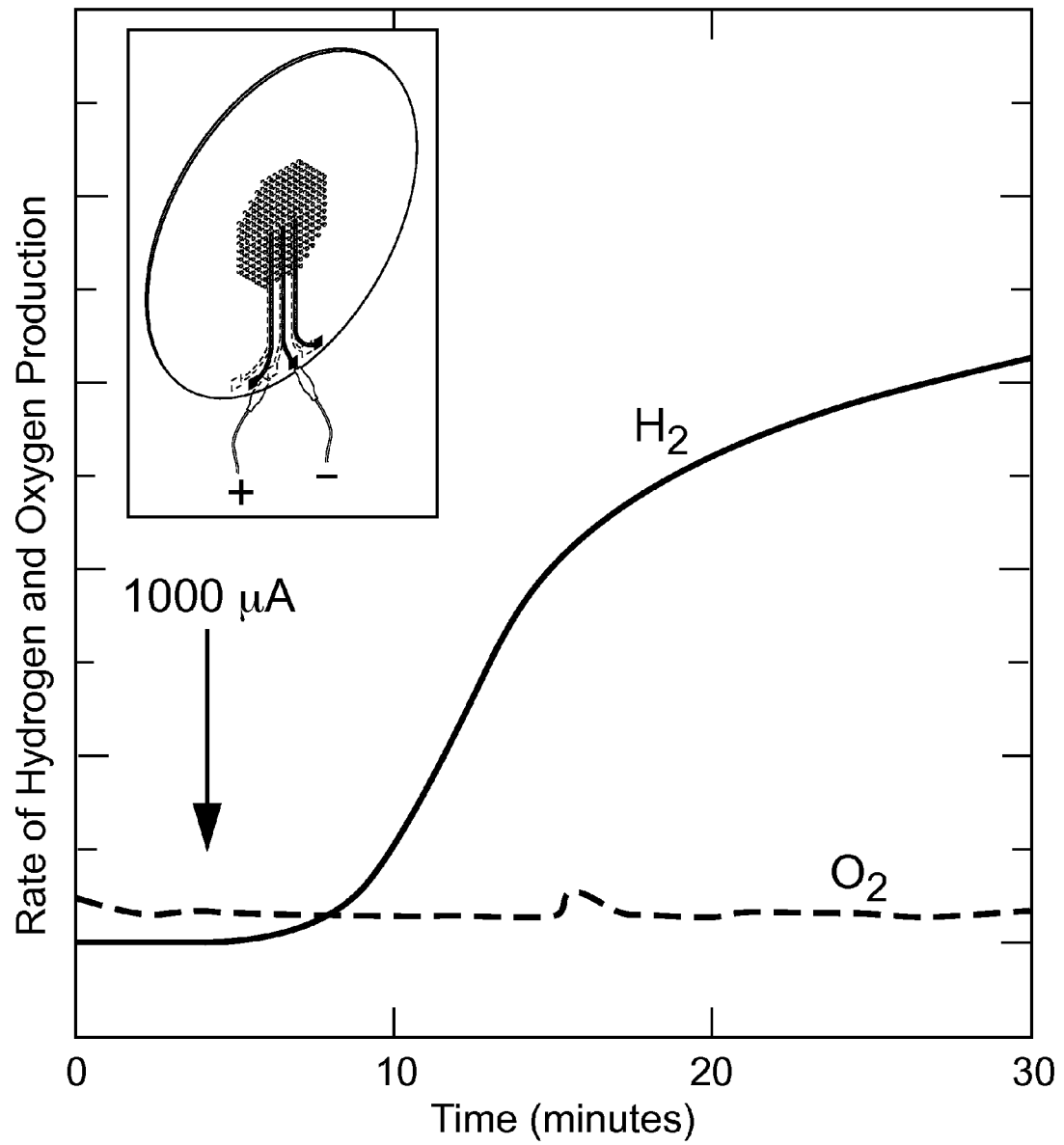
FIG. 13. Graph showing rate of electrolytic hydrogen and oxygen production from photolithographic patterned nickel electrodes on both sides of a four inch silicon wafer when an electrolytic current of 1000 μA on a single microelectrode is used.

The experiment of FIG. 13 is similar to FIG. 12 except that 1000 µA was used. The small response observed for the oxygen data might be baseline noise or the observation of the onset of turbulence causing a small amount of cross-migration at this higher electrolysis current. In any event the integrated content of oxygen in the hydrogen stream was, as in the case for 500 µA, less than 1%.

Example 3

Figure 14:
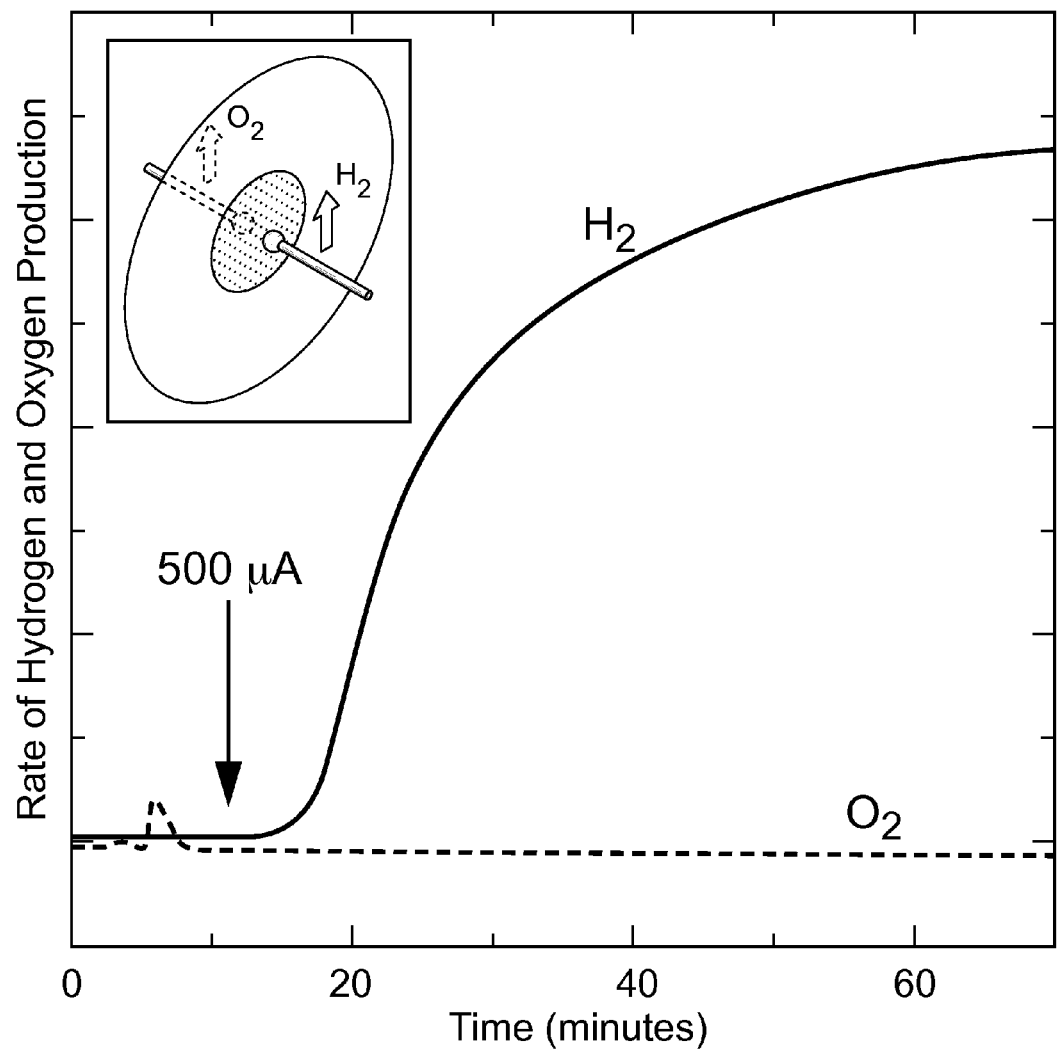
FIG. 14. Graph showing rate electrolytic hydrogen and oxygen production from movable platinum wire electrodes butting up against the opposite sides of a silicon wafer containing patterned pores without patterned microelectrodes on the surface of the wafer.

Another experiment was performed with a silicon wafer similar to that described in Example 1 (i.e., FIG. 10). Data for this experiment is shown in FIG. 14. The experiment was conducted similarly to that of FIG. 12, except that the wafer electrode assembly of FIGS. 4a and 4b (see inset to FIG. 14) was used in conjunction with the apparatus of FIG. 11. The silicon wafer contained the same pattern of pores, but no patterned electrodes on the surface. The electrodes in this experiment were movable platinum wires that were inserted into the cathode and anode chambers via septum ports, as illustrated in FIG. 11. FIGS. 4a and 4b depict a testing protocol for further demonstrating the utility of the present invention. Element 28 is a silicon wafer with pores. An insulting layer of silicon oxide coats 28. Element 30 is the ensemble of pores. Element 32 is an insulated wire with an exposed metal cathode. Element 34 is an insulated wire with an exposed metal anode. Cathode and anode abut their respective surfaces on opposite sides of the wafer. The insulated platinum wires with exposed metal ends pierced the septum 58, shown in FIG. 11. Each electrode butted the surface of the wafer plane.

FIG. 14 presents the data obtained with the apparatus of FIG. 11 using wire electrodes 32 and 34. As shown, the content of oxygen in the hydrogen stream was found to be less than 1%. These data validate the basic physics and chemistry underlying the present invention. They are not specific to any particular method of electrode fabrication. Thus, as illustrated herein, hydrogen and oxygen bubbles rising in laminar flow do not appreciably cross-migrate across the wafer, thereby maintaining good purity of their respective streams.

Example 4

Figure 15:
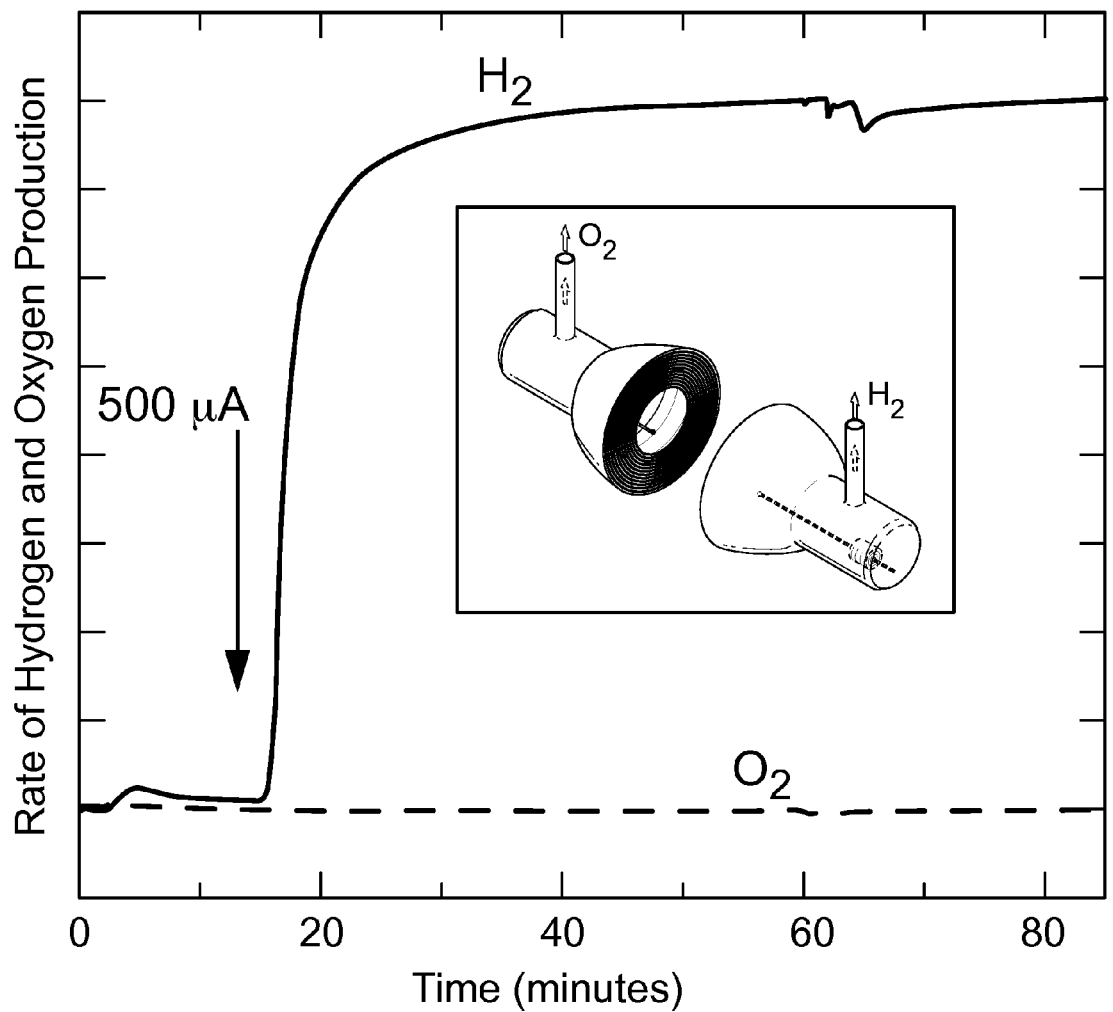
FIG. 15. Graph showing electrolytic rate of hydrogen and oxygen production from a two-chamber test cell with no barrier between the electrodes.

Yet another experiment was performed using no wafer or barrier of any kind in the apparatus of FIG. 11. The electrodes were 1-2 cm apart. The bubbles rising from each electrode were trapped in separate canopies where the hydrogen and oxygen gases were respectively collected and measured. The data for this example are presented in FIG. 15 where the cross-migration of oxygen is again <1%. The significance of this result is that, even in the absence of a physical barrier, for hydrogen and oxygen gases rising in laminar flow streams, very little cross migration between the two gases occurs.

While there have been shown and described what are at present considered the preferred embodiments of the invention, those skilled in the art may make various changes and modifications which remain within the scope of the invention defined by the appended claims.

What is claimed is:

1. An apparatus for the electrolytic splitting of water into hydrogen and/or oxygen, the apparatus comprising:
    at least one lithographically-patternable substrate having a surface;
    a plurality of microscaled catalytic electrodes embedded in said surface, wherein said microscaled catalytic electrodes are either catalytic anode electrodes or catalytic cathode electrodes;
    at least one counter electrode in proximity to but not on said surface, wherein said counter electrode comprises at least one catalytic cathode electrode if said microscaled catalytic electrodes are catalytic anode electrodes, or said counter electrode comprises at least one catalytic anode electrode if said microscaled catalytic electrodes are catalytic cathode electrodes;
    means for collecting evolved hydrogen and/or oxygen gas;
    electrical powering means for applying a voltage across said plurality of microscaled catalytic electrodes and said at least one counter electrode, wherein said electrical powering means are independently addressable to each microscaled catalytic electrode and said at least one counter electrode; and
    a container for holding an aqueous electrolyte and housing said plurality of microscaled catalytic electrodes and said at least one counter electrode.

2. The apparatus of claim 1, wherein said lithographically-patternable substrate is a rigid semiconducting substrate.

3. The apparatus of claim 2, wherein said semiconducting substrate is a silicon-containing substrate.

4. The apparatus of claim 1, wherein said means for collecting evolved hydrogen and/or oxygen gas comprises a canopy trapping device positioned over said plurality of microscaled catalytic electrodes.

5. The apparatus of claim 1, wherein said at least one counter electrode comprises a plurality of microscaled catalytic counter electrodes embedded on a separate lithographically-patternable substrate.

6. The apparatus of claim 5, further comprising means for collecting evolved hydrogen and oxygen gas, wherein said means comprises a canopy trapping device positioned over said plurality of microscaled catalytic electrodes and a separate canopy trapping device positioned over said plurality of microscaled catalytic counter electrodes.

7. The apparatus of claim 1, wherein said plurality of microscaled catalytic electrodes and said at least one counter electrode are not separated by an ion-permeable barrier between said microscaled catalytic electrodes and said counter electrode.

8. The apparatus of claim 1, wherein said plurality of microscaled catalytic electrodes and said at least one counter electrode are housed in separate compartments, provided that means are included for allowing ions to migrant between said compartments.

9. The apparatus of claim 8, wherein said separate compartments are adjoined by a common wall, wherein said common wall includes at least one pore that traverses said common wall.

10. The apparatus of claim 9, wherein said common wall is comprised of said at least one lithographically-patternable substrate having said microscaled catalytic electrodes embedded thereon.

11. The apparatus of claim 10, wherein said lithographically-patternable substrate possesses a first surface on which is disposed a plurality of microscaled catalytic anode electrodes, and a second surface on which is disposed a plurality of microscaled catalytic cathode electrodes, wherein said first surface faces into a first compartment in which oxygen is to be produced, and said second surface faces into a second compartment in which hydrogen is to be produced.

12. The apparatus of claim 1, wherein said electrical powering means includes electrically-conductive bond pads and wiring connected to said electrodes.

13. The apparatus of claim 1, wherein said electrical powering means comprises at least one receiving coil in electrical communication with said microscaled catalytic electrodes, wherein said receiving coil includes means for producing electrical power wirelessly from a wireless transmission source.

14. The apparatus of claim 13, wherein said electrical powering means further comprises a rectenna.

15. The apparatus of claim 1, wherein said electrical powering means further includes circuitry for monitoring voltage and current levels of each microscaled catalytic electrode.

16. The apparatus of claim 15, wherein said electrical powering means further includes circuitry for setting voltage and current levels of each microscaled catalytic electrode.

17. The apparatus of claim 1, wherein said electrical powering means further includes superconducting wires for bringing electric current to the microscaled catalytic electrodes.

18. The apparatus of claim 1, wherein said microscaled catalytic electrodes and electrical powering means have been lithographically patterned onto said lithographically-patternable substrate.

19. The apparatus of claim 18, wherein said lithographically-patternable substrate is hermetically sealed, provided that electrocatalytic surfaces of said microscaled catalytic electrodes are exposed.

20. An apparatus for the electrolytic splitting of water into hydrogen and oxygen, the apparatus comprising:
a first lithographically-patternable substrate having a first surface, and a plurality of microscaled catalytic anode electrodes on said first surface;
a second lithographically-patternable substrate having a second surface, and a plurality of microscaled catalytic cathode electrodes on said second surface;
means for collecting evolved hydrogen and/or oxygen gas;
electrical powering means for applying a voltage across said plurality of microscaled catalytic anode and cathode electrodes, wherein said electrical powering means are independently addressable to each microscaled catalytic anode and cathode electrodes; and
a container for holding an aqueous electrolyte and housing said plurality of microscaled catalytic anode and cathode electrodes.

21. The apparatus of claim 20, wherein said microscaled catalytic anode and cathode electrodes are not separated by an ion-permeable barrier.

22. The apparatus of claim 20, wherein said microscaled catalytic anode and cathode electrodes are separated by an ion-permeable barrier.

23. An apparatus for the electrolytic splitting of water into hydrogen and oxygen, the apparatus comprising:
at least one rigid planar substrate made of a semiconducting composition, the at least one rigid planar substrate having a first surface and a second surface opposite the first surface;
a plurality of microscaled catalytic anode electrodes disposed on said first surface;
a plurality of microscaled catalytic cathode electrodes disposed on said second surface;
at least one pore connecting said first and second surfaces;
electrical powering means for applying a voltage across said plurality of microscaled catalytic anode and cathode electrodes;
a first compartment that surrounds said microscaled catalytic anode electrodes while excluding said microscaled catalytic cathode electrodes, wherein said electrical powering means are independently addressable to each microscaled catalytic anode and cathode electrodes;
a second compartment that surrounds said microscaled catalytic cathode electrodes while excluding said microscaled catalytic anode electrodes; and
means for collecting said hydrogen and oxygen gases;
wherein said rigid planar substrate functions as a common wall adjoining said first and second compartments.

24. An apparatus for the electrolytic splitting of water into hydrogen and oxygen, the apparatus comprising:
at least one first rigid planar substrate made of a semiconducting composition, the at least one first rigid planar substrate having a first planar surface on which a plurality of microscaled catalyst anode electrodes are disposed, and a second planar surface opposite to said first planar surface;
at least one second rigid planar substrate made of a semiconducting composition, the at least one second rigid planar substrate having a first planar surface on which a plurality of microscaled catalytic cathode electrodes are disposed, and a second planar surface opposite to said first planar surface;
a proton exchange membrane having first and second planar surfaces and sandwiched between said first and second rigid planar substrates, wherein said first planar surface of said membrane is in physical contact with said second planar surface of said first rigid planar substrate, and said second planar surface of said membrane is in physical contact with said second planar surface of said second rigid planar substrate;
at least one pore having a first section and a second section, wherein said first and second pore sections are colinear, and said first section extends from said membrane to said first planar surface of said first rigid planar substrate, and said second pore section extends from said membrane to said first planar surface of said second rigid planar substrate;
electrical powering means for applying a voltage across said plurality of microscaled catalytic anode and cathode electrodes, wherein said electrical powering means are independently addressable to each microscaled catalytic anode and cathode electrodes;
a first compartment that surrounds said microscaled catalytic anode electrodes while excluding said microscaled catalytic cathode electrodes;
a second compartment that surrounds said microscaled catalytic cathode electrodes while excluding said microscaled catalytic anode electrodes; and
means for collecting evolved hydrogen and oxygen gases.

25. An electrode device useful as an anode or a cathode in a water electrolysis apparatus, the electrode device comprising a lithographically-patternable substrate having a surface, a plurality of microscaled catalytic electrodes on said surface, and electrical powering means for applying a voltage across said plurality of microscaled catalytic electrodes, wherein said electrical powering means are independently addressable to each microscaled catalytic electrode.

26. A method for producing hydrogen and oxygen gases from the electrolytic splitting of water, the method comprising charging an electrolyzer with an aqueous electrolyte, and electrically powering said electrolyzer to produce hydrogen and oxygen gases, wherein said electrolyzer comprises the apparatus delineated in claim 1.

27. A method for producing hydrogen and oxygen gases from the electrolytic splitting of water, the method comprising charging an electrolyzer with an aqueous electrolyte, and electrically powering said electrolyzer to produce hydrogen and oxygen gases, wherein said electrolyzer comprises the apparatus delineated in claim 20.

28. A method for producing hydrogen and oxygen gases from the electrolytic splitting of water, the method comprising charging an electrolyzer with an aqueous electrolyte, and electrically powering said electrolyzer to produce hydrogen and oxygen gases, wherein said electrolyzer comprises the apparatus delineated in claim 23.

29. A method for producing hydrogen and oxygen gases from the electrolytic splitting of water, the method comprising charging an electrolyzer with an aqueous electrolyte, and electrically powering said electrolyzer to produce hydrogen and oxygen gases, wherein said electrolyzer comprises the apparatus delineated in claim 24.

30. The method of claim 26, wherein said electrolyzer is powered by a renewable energy source.

31. The method of claim 30, wherein said renewable energy source comprises solar energy.

32. The method of claim 30, wherein said renewable energy source comprises wind energy.

33. The method of claim 26, wherein said electrolyzer is electrically powered by nuclear energy.

34. The method of claim 26, wherein said electrolysis method is coupled to a process that utilizes hydrogen or oxygen gas.

35. The method of claim 34, wherein said process is a Fischer-Tropsch process for the synthesis of liquid hydrocarbons.

36. The method of claim 34, wherein said process is a petroleum refining process.

37. The method of claim 36, wherein said petroleum refining process is a hydrodealkylation, hydrodesulfurization, or hydrocracking process.

38. The method of claim 34, wherein said process is a Haber process.

39. The method of claim 34, wherein said process is a hydrogenation process.

40. A method for producing chlorine gas and/or a metal hydroxide by a chloralkali process, the method comprising charging the water electrolyzer delineated in claim 1 with an aqueous metal-chloride salt electrolyte, and electrically powering said electrolyzer to produce chlorine gas at the catalytic anode electrode of the water electrolyzer and hydrogen gas and a metal hydroxide at the catalytic cathode electrode of the water electrolyzer.

41. A method for producing chlorine gas and/or a metal hydroxide by a chloralkali process, the method comprising charging the water electrolyzer delineated in claim 20 with an aqueous metal-chloride salt electrolyte, and electrically powering said electrolyzer to produce chlorine gas at said plurality of microscaled catalytic anode electrodes of the water electrolyzer and hydrogen gas and a metal hydroxide at said plurality of microscaled catalytic cathode electrodes of the water electrolyzer.

42. A method for producing chlorine gas and/or a metal hydroxide by a chloralkali process, the method comprising charging the water electrolyzer delineated in claim 23 with an aqueous metal-chloride salt electrolyte, and electrically powering said electrolyzer to produce chlorine gas at said plurality of microscaled catalytic anode electrodes of the water electrolyzer and hydrogen gas and a metal hydroxide at said plurality of microscaled catalytic cathode electrodes of the water electrolyzer.

43. A method for producing chlorine gas and/or a metal hydroxide by a chloralkali process, the method comprising charging the water electrolyzer delineated in claim 24 with an aqueous metal-chloride salt electrolyte, and electrically powering said electrolyzer to produce chlorine gas at said plurality of microscaled catalytic anode electrodes of the water electrolyzer and hydrogen gas and a metal hydroxide at said plurality of microscaled catalytic cathode electrodes of the water electrolyzer.

44. The method of claim 40, further comprising an ion-permeable membrane separating said catalytic anode electrode and catalytic cathode electrode.

45. The method of claim 40, wherein said metal chloride salt comprises sodium chloride and said metal hydroxide comprises sodium hydroxide.

* * * * *